US008738479B1

(12) United States Patent
LaFever et al.

(10) Patent No.: US 8,738,479 B1
(45) Date of Patent: May 27, 2014

(54) REAL PROPERTY TAX LIEN CATEGORIZATION SYSTEM AND METHODS ASSOCIATED THEREWITH

(71) Applicants: Malcolm Gary LaFever, Lyons, CO (US); Kevin Douglas Matthews, Woodstock, GA (US)

(72) Inventors: Malcolm Gary LaFever, Lyons, CO (US); Kevin Douglas Matthews, Woodstock, GA (US)

(73) Assignee: Terra Firma Portfolio Inc., New York, NY (US)

( * ) Notice: Subject to any disclaimer, the term of this patent is extended or adjusted under 35 U.S.C. 154(b) by 0 days.

(21) Appl. No.: 13/732,082

(22) Filed: Dec. 31, 2012

Related U.S. Application Data

(60) Provisional application No. 61/582,240, filed on Dec. 30, 2011.

(51) Int. Cl.
*G06Q 40/00* (2012.01)
*G06Q 40/02* (2012.01)
*G06Q 50/16* (2012.01)

(52) U.S. Cl.
CPC ............... *G06Q 40/02* (2013.01); *G06Q 50/16* (2013.01)
USPC .......................................................... 705/31

(58) Field of Classification Search
CPC ...... G06Q 50/16; G06Q 40/02; G06Q 40/025
USPC .......................................................... 705/31
See application file for complete search history.

(56) References Cited

U.S. PATENT DOCUMENTS

| 8,521,545 | B2 * | 8/2013 | Thompson et al. ............ 705/1.1 |
| 2005/0197947 | A1 * | 9/2005 | Tyson ............................. 705/36 |
| 2012/0317016 | A1 * | 12/2012 | Hughes .......................... 705/38 |
| 2013/0262339 | A1 | 10/2013 | Kirtchakov | |
| 2013/0262343 | A1 | 10/2013 | Kirtchakov | |

OTHER PUBLICATIONS

Thomas Mcosker, Tax Liens: Trading Liens to Get to the Asset, presentation, Sep. 22, 2011, 36 pages.
Patricia Gutierrez, GFI Group, Inc., First Global Provider of Secondary Market Brokerage Services for Tax Receivables, news release, Mar. 10, 2010, 3 pages, available at www.gfigroup.com.
Patricia Gutierrez, GFI Group, Inc., First Electronic Secondary Market Platform for Tax Receivables, news release, Nov. 22, 2010, 3 pages, available at www.gfigroup.com.

* cited by examiner

*Primary Examiner* — Jessica Lemieux
(74) *Attorney, Agent, or Firm* — Brownstein Hyatt Farber Schreck, LLP

(57) ABSTRACT

A real property tax lien categorization and rating system and associated methods that facilitate classifications and ratings of tax liens from various counties of numerous states in the country, according to a common referenceable category scheme that facilitates identification of liens having common underlying real property characteristics, investment characteristics or other characteristics. In one example, a computer accesses a county server and its tax lien database via the Internet. The computer categorizes the tax liens, for instance into subgroups, and determines a rating for the tax liens based on one or more characteristics. The categorized tax lien information and the ratings of each tax lien are stored by the computer, for instance on one or more databases, so that this information is made available to third-party computers or computing devices (such as mobile devices or tablets) used by potential investors to evaluate the possible purchase of such tax liens. In this manner, the system provides classifications and ratings of tax liens from various counties of numerous states in the country in a manner that can be accessed by potential investors over the Internet.

20 Claims, 9 Drawing Sheets

Skip Global Navigation and Quick Links or Go to Global Navigation or Go to Quick Links

Jefferson County
http://jeffco.us

Treasurer
100 Jefferson County Parkway
Golden, CO 80419
303-271-8330

Looking for something?  HOME | CONTACT US  [SEARCH] by Google

About Jeffco | Departments | News | Careers | Online Services | A-Z Index

Go to Treasurer Nav

Treasurer

Tax Lien Sale

Treasurer Home
About Treas. Office
Tax Lien Sale
Important Dates
Property Tax

The sale will be held at www.sri-onlineauctions.com

AUCTION FORMAT

The tax lien sale will be held as an Internet auction administered by SRI Incorporated. Tax liens available for bid will be listed on the SRI web site www.sri-onlineauctions.com beginning October 20, 2011 at 9 a.m. Bidding will close hourly in batches of approximately 180 liens per batch. Each page is considered a batch. The first batch (page one) will close at 8:00 a.m. Mountain Time on October 24, 2011 and continuing closing each hour until 8:00 p.m. The bidding rules will be posted at least two weeks before the beginning of the actual auction. Two computers will be available for use in the Treasurer main lobby. Questions regarding the operation of the auction should be addressed to SRI at 1-800-800-9588.

Contact us
Treasurer
100 Jefferson County
Parkway
Golden, CO 80419
303-271-8330
Email:
treasurer@jeffco.us Office Hours:
7.30 a.m. - 5.30 p.m.
Monday - Friday

REGISTRATION

All Bidders must register with both the Jefferson County Treasurer's Office and the auction provider SRI in order to participate in the Tax Lien Sale. Once a bidder has registered with both parties, the Jefferson County Treasurer's Office will inform SRI that the bidder is approved to start bidding; this can take up to 24 hours. Registration will take place from October 10, 2011 through October 18, 2011. Registration closes at 11:59 P.M. Mountain Time on October 18.
No registration will be allowed after October 18, 11:59 PM Mountain Time.

Registration with Jefferson County involves a two-step process. First, one must fully complete the Registration Process on our secure web site. This is the only way to register with Jefferson County. Hard copies mailed or faxed to the county will not be accepted as registration.

Fill out the registration form online, fill out the W-9 form and print it.

Next, you must either mail or fax in the completed W-9 (name, address, social security or employee ID number, sign and date it) form along with your voided check (deposit slips are not accepted) for the account to be charged for all winning bids to:

Jefferson County Treasurers
100 Jefferson County Pkwy, Suite 2520
Golden CO 80419-2520
303-271-8359 (fax)

Bidders are responsible for seeing that the information supplied on all registration forms is legible and correct and that the name supplied on these forms is the same since the Certificates of Purchase are prepared from this information. Each Bidder will bid and purchase in the name listed. Bidders must register with the same name when registering with Jefferson County Treasurer and SRI.

Information for registration with SRI can be found on its Web site www.sri-onlineauctions.com.

No one will be allowed to bid until all the registration requirements have been completed and verified.

Payment for all winning bids will be made by automatic withdrawal from the bidder's U.S. checking account to Jefferson County at the conclusion of the auction. This is the only form of payment accepted. Payment transfers that are rejected due to lack of funds or other reasons may result in cancellation of the corresponding bid(s) subject to CRS 39-11-116.

All tax lien certificates will be kept in safekeeping at our office. With the certificates retained at the Treasurers office, you will receive your payment faster after the lien is paid. It also allows for you to endorse the certificate without having to find them and mail them in to the office. At the end of the sale, you will be emailed a list of the tax lien certificates you purchased.

SALE

Liens will be offered in four sections: improved property, vacant land, unbuildable strips and mobile homes.

The sequence will be in schedule number order per the four sections mentioned above. Property owners will be able to pay their taxes and avoid having them go to the sale through October 19, 2011. After this date, all properties will be sold.

The tax schedule number and total tax lien dollar amount of each lien will be displayed on the auction site. All successful bids are final. Once a bidder has placed a bid amount, it can not be lowered or cancelled. No changes in, or cancellation of a purchased lien will be made after a bid has been made on a lien or the item has closed.

OVERVIEW

Delinquent real property taxes go to tax lien sale in the fall of each year. At the tax lien sale, investors pay the delinquent amount due on a property, which grants the investor a lien on the property.

The property owner has three years to redeem the tax lien before the investor is eligible to apply for a Treasurer's Deed on the property. In addition to the amount of the delinquent taxes, the property owner pays an interest charge which is credited to the tax lien investor.

For mobile home tax liens, the redemption period is one year.

The tax lien sale enables the Treasurer's office to collect virtually all tax dollars for each government entity in a timely fashion. Tax liens can also be an excellent addition to an investor's portfolio.

DESCRIPTION

The tax lien sale is the final step in the Treasurer's efforts to collect taxes on real property. A tax lien is placed on each property in the county on January 1 each year and remains until the property taxes are paid. If the property owner does not pay the taxes on their property by late October, the county sells the tax lien at the yearly tax lien sale. The tax lien is auctioned to the highest bidder, who then becomes the tax lien certificate holder.

The tax lien sale allows the taxing authorities to receive their budgeted revenue without having to wait for the delinquent taxes to be collected. It also offers an investment opportunity to the general public, who may purchase tax lien certificates and earn a potentially attractive interest rate.

- Colorado Statutes set the interest rate at 9% above the federal discount rate to member banks on September 1 of each year. Tax certificates sold at the 2011 sale will bear an interest of 10%. The initial interest rate holds for the life of the tax lien certificate.
- Often, the successful bidder must pay a premium price above the amount of the delinquent taxes in order to purchase the tax lien certificate. The premium is not paid back.
- Interest is earned on the face amount of the certificate, which does not include any bidding premium paid, from the date of the sale to the date that the property owner redeems the certificate by paying the delinquent taxes, interest, and costs.
- The property owner may redeem the property from the tax lien certificate holder at any time, from the day of the sale right up to the day that a tax deed would be issued.
- If the property owner does not redeem the property (pay the delinquent taxes), the tax lien certificate holder can pay the required costs and fees and apply for a Treasurer's Deed after three years.
- Per Colorado State Statute 39-11-151, county officials and employees may not acquire land

200

Fig. 2 Con't by tax sale.

| Tax Sale Statistics | | | | | | | | | |
|---|---|---|---|---|---|---|---|---|---|
| Tax Year/Pay | Sale Date | # Sold | Cert. Amount | Premium Paid | Premium % | Buyers | Int. Rate | County Purchases | County Amount |
| 2002/03 | Oct. 30-31 | 2183 | 4,286,727 | 197,501 | 4.6 | 154 | 11 | 59 | 20,073 |
| 2003/04 | Oct. 19 - 28 | 2444 | 4,454,845 | 226,816 | 5.09 | 54 | 12 | 148 | 22,739 |
| 2004/05 | Oct. 17-24 | 2270 | 4,581,439 | 301,602 | 6.58 | 99 | 14 | 74 | 9,339 |
| 2005/06 | Oct. 18-25 | 2641 | 6,314,501 | 449,087 | 7.11 | 77 | 15 | 138 | 13,445 |
| 2006/07 | Oct. 25-29 | 2212 | 5,606,304 | 374,363 | 6.68 | 61 | 15 | 124 | 9,265 |
| 2007/08 | Oct. 24-28 | 2019 | 5,545,198 | 187,093 | 3.37 | 73 | 11 | 93 | 34,541 |
| 2008/2009 | Oct.22-26 | 1950 | 6,586,166 | 94,919 | 1.44 | 83 | 10 | 305 | 51,176 |
| 2009/2010 | Oct21-25 | 1738 | 8,350,678 | 211,640 | 2.53 | 96 | 10 | 476 | 225491 |

Information about the tax lien sale is presented in a power point presentation (select the "tax lien seminar" button in the tax lien sale drop box).

↙ 200

Fig. 2 Con't

REAL PROPERTY TAX LIEN CATEGORIZATION SYSTEM AND METHODS ASSOCIATED THEREWITH

CROSS REFERENCE TO RELATED APPLICATION

This application claims the benefit under 35 U.S.C. 119(e) to U.S. Provisional Patent Application No. 61/582,240 filed Dec. 30, 2011 entitled "Real Property Tax Lien Investment System and Categorization, Grouping and Indexing Methods Associated Therewith" the disclosure of which is hereby incorporated by reference in its entirety.

FIELD

The present invention is related to tax lien investment categorization systems.

BACKGROUND

Counties across the United States levy property taxes on real property situated within their borders to help finance their operations. A tax bill is then sent by the county to the property owner. Thereafter, the taxes are typically paid by the owner of the real property. However, for a variety of reasons, sometimes the taxes on a given piece of real property are not paid in a timely manner. Thereafter, the counties undertake to obtain the taxes they are owed.

Counties utilize the state tax codes to obtain the money they are owed from unpaid real property taxes. The applicable tax code for the different states can be broadly separated into three categories: (1) tax lien states; (2) tax deed states; and (3) tax lien/tax deed hybrid states. In tax lien states and tax lien/tax deed hybrid states, counties conduct sales of tax liens to investors. When the owner of a piece of real property with a tax lien pays their taxes, the buyer of the tax lien receives their principal (i.e., the face amount of the tax lien which they purchased) and some amount of a monetary benefit on their principal. The amount of the monetary benefit varies with each jurisdiction and the buyer of a tax lien can influence their ultimate return on investment by the amount they bid for a given tax lien, such as, for example, by paying only the face amount of the lien or paying a large or small premium over the face amount of the tax lien.

Several problems exist with the current tax lien system. In large part, the existing tax lien system is inefficient for counties to administer and fails to maximize revenues to help finance county operations. This results in lost potential additional revenues and increased costs to the counties. Another problem, as recognized by the present inventors, is that a system does not exist for placing available tax liens into categories or subsets to facilitate comparison of tax liens for purchase by investors. Yet another problem is that in the process of selling tax liens, some tax liens may go unsold. This creates a difficult situation for the county government, because they are not maximizing tax-lien related revenues to pay their staff, vendors or the cost of services provided by the county to its citizens and members of the public. Still yet another problem, as recognized by the present inventors, is that, from the investor's standpoint, it is difficult to buy tax liens from more than one county because in many states the counties conduct their tax lien auctions on the same day.

The foregoing problems result in inefficiencies in the tax lien system that can be improved. Accordingly, as recognized by the present inventors, there is a need for additional systems and/or methods that address one or more of the problems or shortcomings noted above.

SUMMARY

It is to be understood that the present invention includes a variety of different versions or embodiments, and this Summary is not meant to be limiting or all-inclusive. This Summary provides some general descriptions of some of the embodiments, but may also include some more specific descriptions of other embodiments.

The systems and methods described herein are not tax strategies. To be clear, the systems and methods described herein are not strategies for reducing, avoiding, or deferring tax liability. Indeed, at least some embodiments of the one or more present inventions described herein are anticipated to facilitate a county's ability to maximize revenues from tax lien sales and to more readily collect property taxes it is owed.

In at least one embodiment, a systematic approach for facilitating automation of a categorization and rating of tax liens is presented. Improvements to the tax lien system described herein can maximize associated revenues and save the county financial resources associated with making tax liens available for purchase by investors. According to an embodiment of the present invention, tax liens are organized into categories and/or subsets that can facilitate comparison among tax liens and/or meet certain investment parameters.

According to one broad aspect of an embodiment of the present invention, disclosed herein is a computer system for rating a plurality of tax liens of real properties from a plurality of county government computing systems across the country that each have at least one county database containing county tax lien information relating to each of the tax liens of each real property in a county. In one example, the computer system of this embodiment of the invention comprises at least one computer connected to a network and adapted to communicate with the plurality of county government computing systems to receive the county tax lien information including each of said plurality of tax liens, the computer determining one or more ratings of each of said plurality of tax liens; and at least one database connected with the at least one computer, the at least one database configured to store each of said one or more ratings associated with each of said plurality of tax liens; wherein the one or more ratings of each of said plurality of tax liens is accessible from the at least one database over the network to one or more third party computers such as computers used by potential investors in such tax liens. In this manner, this embodiment provides ratings of each tax lien across the country from various county governments across numerous states, and these ratings can be used by potential investors to analyze potential purchases of tax liens in different counties.

In one example, the one or more ratings of each of said plurality of tax liens are based on one or more common characteristics of the tax liens, and/or the one or more ratings of each of said plurality of tax liens are based on one or more common characteristics of the real properties associated with the tax liens. For instance, the one or more ratings of each of said plurality of tax liens may include an indication of whether a tax lien relates to a residential property, a commercial property, and/or a vacant property. In another example, the one or more ratings of each of said plurality of tax liens may be based upon an assessed value of a property, an amount of a tax lien, an assessed land value of the real property associated with a tax lien, and/or an assessed building value of the real property associated with a tax lien. In this manner, by the computer determining a rating for each tax lien based on common characteristics of each tax lien, the computer system can provide the ratings to potential investors so that the investors can use the ratings to quickly compare various tax liens in different counties in different states, which thereby helps the investor evaluate which tax liens the investor may wish to purchase.

In another example, the at least one computer of the system obtains other information relating to each tax lien, including mortgage information related to the real property associated with the tax lien; bankruptcy information related to an owner of the real property associated with the tax lien; and/or other items of information as disclosed herein.

According to another broad aspect of an embodiment of the present invention, disclosed herein a computer system for rating a plurality of tax liens of a county government having a county server coupled with a county tax lien database containing county tax lien information available over a network such as the Internet. In one example, the system includes a computer connected to the network, the computer using a categorization protocol adapted for categorizing the county tax lien information from the county tax lien database, the computer determining and providing a rating for each of said plurality of tax liens; and a database coupled with the computer and adapted for storing categorized tax lien information and the ratings for each of said plurality of tax liens, the categorized tax lien information and the ratings for each of said plurality of tax liens in the database adapted to be accessible to one or more third-party computers, such as computers used by potential investors, via the network.

In one example, the categorizing protocol includes a plurality of criteria as disclosed herein, such as but not limited to, whether the real property associated with each tax lien is a residential property; a plurality of ranges of assessed building values of the real properties associated with each tax lien; an amount of each tax lien; whether a tax lien relates to a residential property; whether a tax lien relates to a commercial property; a range of an assessed land value of the real property associated with the tax liens; and/or a range of an assessed building value of the real property associated with the tax liens.

According to another broad aspect of another embodiment of the present invention, disclosed herein is a computer system for categorizing a plurality of tax liens from a plurality of county government computing systems, each of said plurality of county government computing systems having at least one county database containing county tax lien information, each county government computing system accessible over a network. In one example, the system includes at least one computer connected to the network and adapted to communicate with the plurality of county government computing systems to receive the county tax lien information, the at least one computer using a categorization protocol adapted for categorizing the county tax lien information from at least one county database of each of the plurality of county government computing systems; and at least one database connected with the at least one computer, the at least one database adapted for storing the categorized tax lien information, wherein the categorized tax lien information is accessible from the at least one database over the network to one or more third party investor computers. The categorization protocol may include a plurality of criteria as disclosed herein, such as but not limited to, whether the real property associated with each tax lien is a residential property; a plurality of ranges of assessed building values of the real properties associated with each tax lien; and/or an amount of each tax lien.

As described herein, the criteria used by the system may include various characteristics of the tax lien or of the property associated with the tax lien, or other information related to the tax lien or property. Such information may include, but is not limited to, one or more of the following characteristics:

1. Property Identification: The property identification utilized by the county (such as parcel number), and the street address of the property.
2. Owner: Identification of the property owner, and the owner's mailing address.
3. Lien Amount: The minimum bid amount determined by the county, generally consisting of the tax amount due, penalties and/or interest, administrative costs, recording fees, and other similar costs incurred by the county in connection with the tax sale.
4. Interest and/or Penalty Rate: The interest rate and/or penalty rate due upon redemption, as set by statute.
5. Redemption Period: The period of time during which the lien may be redeemed, as set by statute.
6. Sale Method: The auction method used by the county at the tax sale, including but not limited to premium bid, bid down interest, bid down ownership, open bidding, rotational bidding, random bidding, and other methods or combinations of methods that may be identified.
7. Outstanding Tax Liens: Whether the property is subject to outstanding county tax liens, and if so the number, amount, and age of the previously filed liens.
8. Assessed Property Value: The estimated value of the real property that the lien is placed against, which may be determined by the local government's assessor, a private appraisal entity, or other means. This may be further disaggregated into the value of the land, the value of any structures or other improvements on the land, the value of any mineral rights, etc.
9. Property Area: The total area of the land that the lien is placed against.
10. Structure Area: The total floor area of any structures that are on the property.
11. Structure Age: The age of any structures or other improvements that are on the property.
12. Property Use: Categorization of the property based on use, such as residential, commercial, agriculture, etc.
13. Zoning: The current zoning classification for the property, as determined by the authority having jurisdiction.
14. Floodplain: Whether the property, or a portion of the property, is within a 100 year floodplain as identified by the Federal Emergency Management Agency.
15. Subdivision: Whether the property is within a subdivision recognized by the county.
16. Mortgages: Whether there is a mortgage on the property, and if so the amount.
17. Federal Tax Liens: Whether the property is subject to federal tax liens, and if so the number, amount, and age of the previously filed liens.
18. State Tax Liens: Whether the property is subject to state tax liens, and if so the number, amount, and age of the previously filed liens.
19. Federal Environmental Protection Agency Liens: Whether the property is subject to federal Environmental Protection Agency liens, and if so the number, amount, and age of the previously filed liens.
20. State Environmental Protection Agency Liens: Whether the property is subject to state environmental protection agency liens, and if so the number, amount, and age of the previously filed liens.
21. Bankruptcy: Whether the owner is in the process of bankruptcy.

22. Minimum Value: Either a minimum lien value, or a minimum property assessment value.
23. Lien to Value Ratio: The ratio of the lien amount to the assessed property value.

In at least one embodiment, the available county tax lien information is accessed by a computer of the systems of the present invention, and thereafter the information is analyzed to organize the tax liens into categories with each category representing tax liens that share common characteristics or investment risks or opportunities. The categories are used to identify similar types of tax liens that involve substantially similar property types with relatively uniform characteristics, which enables use of a common referenceable categorization scheme to identify tax liens that share common characteristics and fall within common categories.

Accordingly, a computer implemented method of organizing a common referenceable categorization scheme for identifying similar categories of tax liens is provided, comprising in one example: causing a first computer to communicate with a database associated with a second computer, the database containing a plurality of information associated with a plurality of tax liens; accessing the database to read the plurality of information; and categorizing the plurality of information into a plurality of values using a plurality of criteria. In at least one embodiment, the method further comprises publishing the details of the common referenceable categorization scheme and identifying for each tax lien the specific categorization scheme value associated with that tax lien.

If adopted by a county, use of a common referenceable categorization system could potentially increase revenues by enabling investors to more easily evaluate investment opportunities and increasing demand for, and participation in, tax lien sales, thereby improving revenue maximization compared to present-day systems that many counties use.

In at least one other embodiment, the available county tax lien information is accessed by a computer of the system disclosed herein, and thereafter the information is analyzed to organize the tax liens into groups or subsets associated with investment risk or desirable characteristics. The groups or subsets may be mixed property types and characteristics to arrive at relatively heterogeneous grouping of tax liens, and/or the groups or subsets may be substantially similar property types with relatively uniform characteristics to arrive at a relatively homogenous grouping of tax liens.

Accordingly, a computer implemented method of organizing an investment for purchase is provided, comprising in one example: causing a first computer to communicate with a database associated with a second computer, the database containing a plurality of information associated with a plurality of tax liens; accessing the database to read the plurality of information; and grouping the plurality of information into a plurality of subsets using a plurality of criteria. In at least one embodiment, the method further comprises causing a purchase of at least a portion of the plurality of tax liens residing within at least one of the plurality of subsets. If adopted by a county, use of tax lien subsets would potentially enable the county to conduct faster tax lien sales, thereby saving the county valuable financial resources associated with the present-day auction system that many counties use.

According to another broad aspect of another embodiment of the present invention, disclosed herein is a computer implemented method of organizing real property tax lien information. In one example, the method may include causing a first computer to communicate with a first database associated with a second computer, the database containing a plurality of information associated with a plurality of tax liens related to a plurality of real properties; accessing the database to read the plurality of information; and grouping the plurality of information into a plurality of subsets using a plurality of criteria. The method may also include storing the plurality of information in a second database according to the subsets from the grouping operation. In another example, the method may also include providing computerized access to the second database by a plurality of investor computers so that each of said investor computers can receive the plurality of information in the second database grouped according to the subsets. In another embodiment, the method may include facilitating a purchase of at least a portion of the plurality of tax liens residing within at least one of the plurality of subsets.

In one example, the second computer and the first database are operated by a county government. The plurality of criteria may include one or more of various factors as described herein (or a combination thereof), such as but not limited to, whether the real property associated with each tax lien is a commercial property; whether the real property associated with each tax lien is a residential property; whether the real property associated with each tax lien is a vacant property; an assessed land value of the real property associated with each tax lien; an assessed building value of the real property associated with each tax lien; an amount of each tax lien; a plurality of ranges of assessed building values of the real properties associated with each tax lien.

According to another broad aspect of another embodiment of the present invention, disclosed herein is a computer implemented method of organizing real property tax lien information. In one example, the method may include causing at least a first computer to communicate with one or more databases (such as databases operated by various county governments) associated with one or more second computers (such as computers or servers operated by various county governments), the databases containing a plurality of information associated with a plurality of tax liens related to a plurality of real properties; accessing the databases to read the plurality of information; grouping the plurality of information into a plurality of subsets using a plurality of criteria; and storing the plurality of information in at least one second database according to the subsets from the grouping operation. The method may also include providing computerized access to said at least one second database by a plurality of investor computers so that each of said investor computers can receive the plurality of information in the at least one second database grouped according to the subsets. In another example, the method may include facilitating a purchase of at least a portion of the plurality of tax liens residing within at least one of the plurality of subsets.

Various components are interchangeably referred to herein as "operably associated with," "connected with," "coupled with," "in communications with" or the like. As used herein, these phrases refer to components that are linked together in operable fashion, and encompasses embodiments in which components are linked directly, linked indirectly, and/or embodiments in which additional components are placed between the two linked components.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Various embodiments of the present inventions are set forth in the attached figures and in the Detailed Description as provided herein and as embodied by the claims. It should be understood, however, that this Summary does not contain all of the aspects and embodiments of the one or more present inventions, is not meant to be limiting or restrictive in any manner, and that the invention(s) as disclosed herein is/are understood by those of ordinary skill in the art to encompass obvious improvements and modifications thereto.

Additional advantages of the present invention will become readily apparent from the following discussion, particularly when taken together with the accompanying drawings.

BRIEF DESCRIPTION OF THE DRAWINGS

To further clarify the above and other advantages and features of the one or more present inventions, a more particular description of the one or more present inventions is rendered by references to specific embodiments thereof that are illustrated in the appended drawings. It should be appreciated that these drawings depict only typical embodiments of the one or more present inventions and are therefore not to be considered limiting of its scope. The one or more present inventions are described and explained with additional specificity and detail through the use of the accompanying drawings in which:

FIG. 2 depicts an example of a webpage pertaining to tax liens from an example of an existing website for Jefferson County, Colorado;

DETAILED DESCRIPTION

Figure 1:
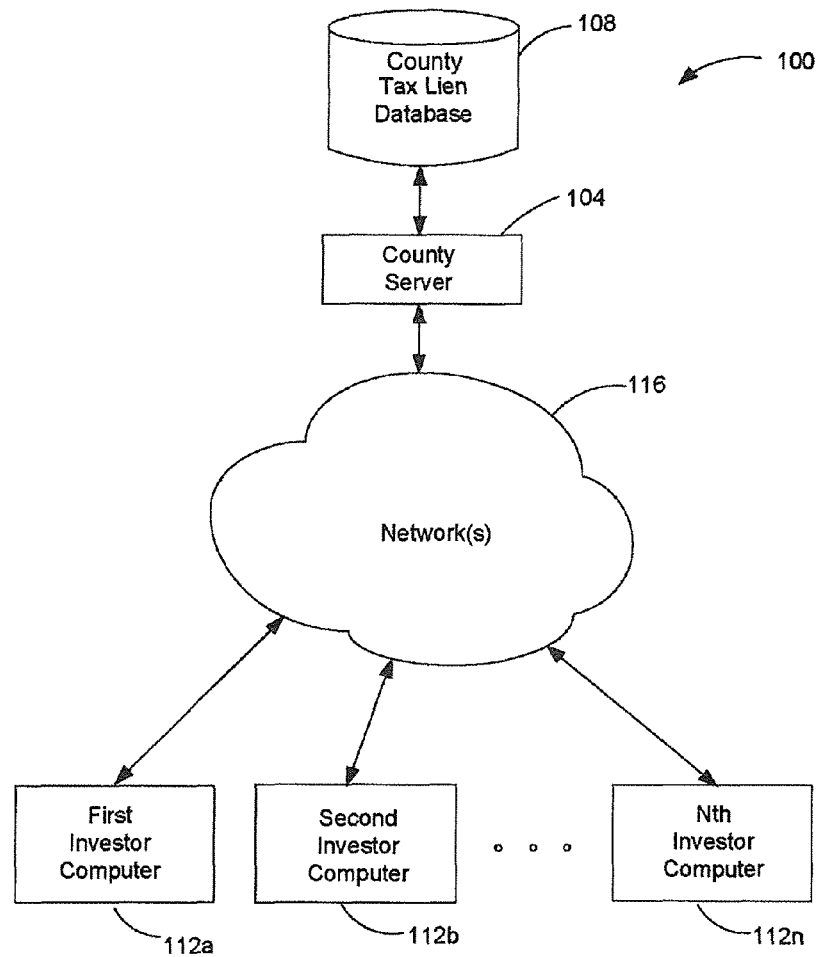
FIG. 1 is a block diagram depicting network architecture of a computerized tax lien information system.

Disclosed herein are various embodiments of computer systems for categorizing and rating a plurality of tax liens of real properties from a plurality of county government computing systems across the country that each have at least one county database containing county tax lien information relating to each of the tax liens of each real property in a county. In one example, a computer system may include at least one computer (such as, but not limited to, 112a in FIG. 3; 504 in FIG. 6; or 504 in FIG. 7) connected to a network and adapted to communicate with the plurality of county government computing systems to receive the county tax lien information including each of said plurality of tax liens, the computer categorizing the tax liens based on one or more characteristics as disclosed herein, and if desired, the computer determining one or more ratings of each of the tax liens; and at least one database (such as, but not limited to, 304 in FIG. 3, 508 in FIG. 6, or 508 in FIG. 7) connected with the at least one computer, the at least one database configured to store the categorized tax lien information and each of the ratings of the tax liens; wherein the one or more ratings of each of said plurality of tax liens are accessible from the at least one database over the network to one or more third-party computers such as computers used by potential investors in such tax liens. In this manner, this embodiment of the invention provides categorization of the tax lien information as well as ratings of each tax lien across the country from various county governments across various states, and this categorized information and these ratings can be used by potential investors to analyze potential purchases of tax liens in different counties across the country—which will provide a significant computer implemented tool for potential investors of such tax liens.

In one example, the one or more ratings of the tax liens are based on one or more common characteristics of the tax liens, and/or one or more common characteristics of the real properties associated with the tax liens. For instance, the ratings of each tax lien may include an indication of whether a tax lien relates to a residential property, a commercial property, and/ or a vacant property. In another example, the ratings of each tax lien may be based upon an assessed value of a property, an amount of a tax lien, an assessed land value of the real property associated with a tax lien, and/or an assessed building value of the real property associated with a tax lien. In this manner, by the computer determining a rating for each tax lien based on common characteristics of each tax lien, the computer system can provide the ratings to potential investors so that the investors can use the ratings to quickly compare various tax liens in different counties in different states, which thereby helps the investor evaluate which tax liens the investor may wish to purchase.

In another example, the at least one computer of the system obtains other information (see, e.g., optional data bases 109 in FIG. 7) relating to each tax lien, including mortgage information related to the real property associated with the tax lien; bankruptcy information related to an owner of the real property associated with the tax lien; and/or other items of information as disclosed herein.

One or more embodiments of the one or more inventions described herein may include a computer utilizing a categorization protocol that categorizes purchasable tax liens into different subsets based on the associated properties' characteristics and/or specifics regarding the tax liens corresponding to the properties; the computer may implement the protocol by accessing county database information, filtering the information, and thereafter organizing the tax liens into potential groups for purchase. The computer may also determine ratings for purchasable tax liens based on common categorization characteristics or values that represents the associated properties' characteristics and/or specifics regarding the tax liens corresponding to the properties—and the computer may access county database information, and assign to each tax lien an appropriate rating (or categorization value) for that tax lien thereby facilitating easier comparison between and among tax liens with respect to underlying property characteristics, investment risks and opportunities associated with the tax liens.

Notation and Nomenclature

Embodiments described herein can be implemented on one or more computers (such as 112a in FIG. 3, 504 in FIG. 6, or 504 in FIG. 7) by utilizing software to implement one or more aspects of embodiments of the present inventions. The computers can be a personal computers, notebook computers, server computers, servers, mainframes, networked computers (e.g., routers), handheld computers, personal digital assistants, tablet computers, mobile devices, smart phones, workstations, and the like.

In at least one embodiment, the computers include a processor coupled to a bus and memory storage coupled to the bus. The memory storage can be volatile or non-volatile and can include removable storage media. The computers can also include a display, and provisions for data input and output.

One or more databases (for instance, databases 306 in FIG. 3, databases 508 in FIG. 6, or databases 508 in FIG. 7) can be used by the computer to store information, including tax lien information, categorized tax lien information, and ratings associated with each tax lien. The databases, if desired, can include any conventional database technology and can be implemented using a variety of conventional storage devices such as disk drives, non-volatile storage devices, RAID storage architectures, cloud storage, Network attached storage, or any other conventional storage mechanisms.

Some portion of the detailed descriptions that follow are presented in terms of procedures, steps, logic block, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process is generally conceived to be a sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers or the like.

Unless specifically stated otherwise as apparent from the following discussions, it is appreciated that discussions utilizing terms such as "identifying," "defining," "pooling," "categorizing," "rating," "determining," and "grouping" or the like refer to the actions and processes of a computer system using certain criteria, such as subset criteria, and that a computer or a similar electronic computing devices may be used, including an embedded system, that manipulates and transfers data represented as physical (electronic) quantities within the computer system's registers and memories into other data similarly represented as physical quantities within the computer system memories or registers or other such information storage, transmission or display devices.

Tax Lien System Including Categorization and Rating of Tax Liens

The present inventors recognize that different types of real properties represent different levels of investment risk and/or investment opportunity for tax lien investors. That is, although the percent return on a $1000 tax lien may theoretically be the same for a piece of residential property or vacant land within a given state, the present inventors recognize that the risk and actual rate of return varies with the type of property involved. For example, a piece of real property with a house on it may represent a first category of risk or rate of return. A piece of land that is a vacant lot with no improvements on it may represent a second category of risk or rate of return. Yet another piece of real property with a commercial building on it may represent yet a third category of risk or rate of return. Such properties are understood by the present inventors to have variable risk or rate of return because owners of certain property types are more likely to pay the taxes during different time horizons on the property than on other types of properties. By way of example, and assuming other factors being substantially equal, a piece of real property with an improvement is more likely to have its tax liens paid than a piece of vacant land. To carry this example further, a piece of real property with a homestead (occupied residence) is more likely to have its tax liens paid off than a vacant piece of land. The real property serves to secure the tax lien. Moreover, the present inventors recognize that tax liens are sought after because the returns on investments are not only secured by the associated real property, but for most jurisdictions, banks holding mortgages on the real property are set at a lower priority in the secured chain and therefore the banks are likely to ensure payment of unpaid tax liens prior to foreclosure on the property due to failure to pay tax liens. Accordingly, with many types of investment returns being relatively low, some investors consider purchasing tax liens to be an attractive investment. Lastly, different geographic regions of the country may have stronger real property markets with greater demand thereby increasing the potential value that can be realized upon the sale of real property underlying a tax lien if the tax lien is not redeemed in which event the purchaser of the tax lien can secure title to the real property and also reducing the likely time necessary to carry the property on the market prior to receiving acceptable offers to purchase the property.

FIG. 1 illustrates a system 100 showing how some counties make tax lien information available to the public. More specifically, one or more counties currently provide a computer or server 104 that is connected to a tax lien database 108 that includes data from the county tax lien system. One or more investors can access at least some of the data using a networked computer, such as a first computer 112a, second computer 112b, through an nth computer 112n. Such computers are interconnected to the Internet via network 116 such that the investors can review the county tax lien information. In addition, some counties currently allow bidding for the tax liens to occur over the Internet. FIG. 2 illustrates an example of an October 2011 tax lien system 200 accessible over the Internet for Jefferson County, Colorado. However, the tax liens are not identified by category values representing different categories of property types sharing common characteristics.

Figure 3:
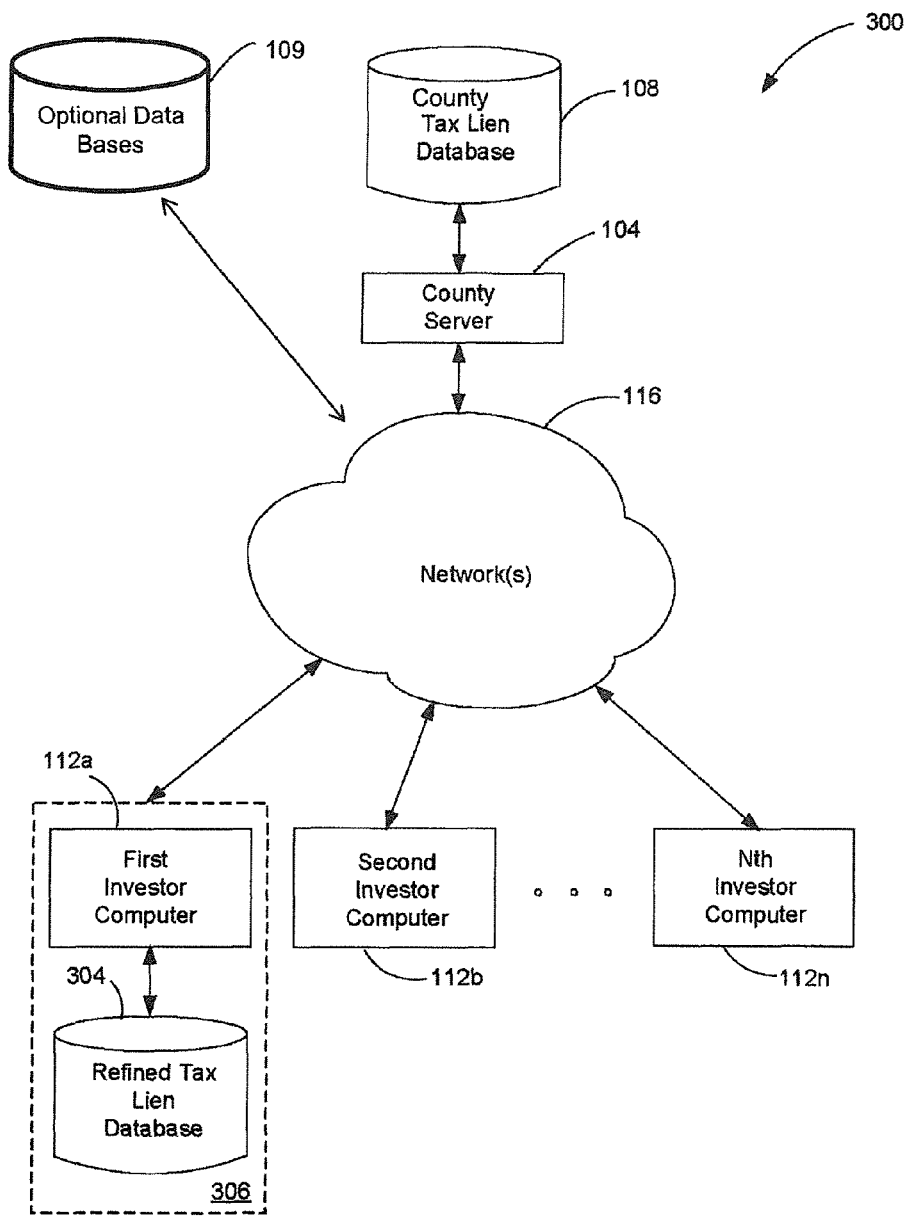
FIG. 3 is block diagram depicting network architecture of a computerized tax lien information system in accordance with at least one embodiment of the one or more present inventions.
Figure 4:
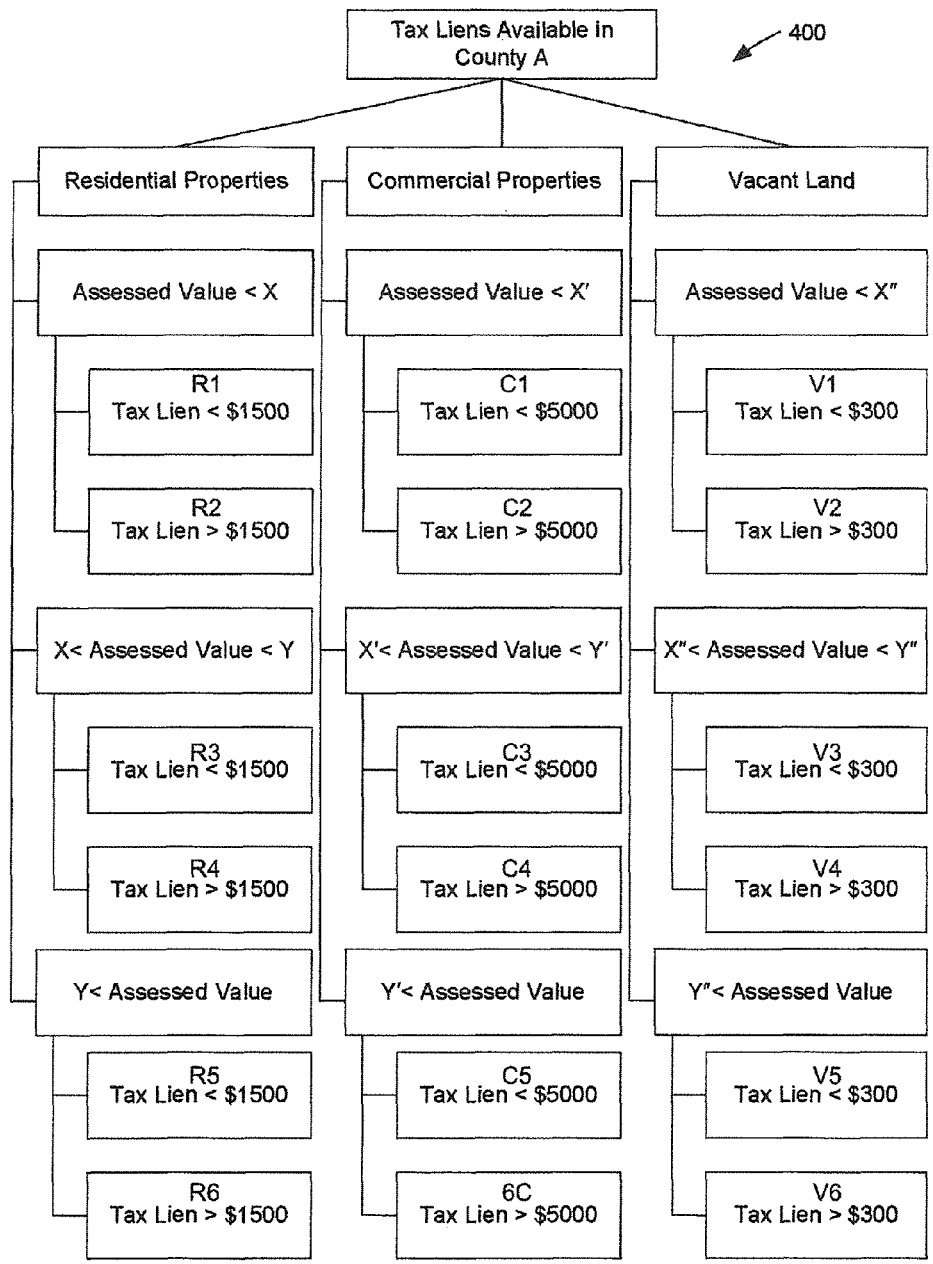
FIG. 4 is an embodiment of a possible categorization scheme for tax liens, in accordance with an embodiment of the present invention.

Accordingly, and with reference now to FIGS. 3 and 4, in at least one embodiment of the one or more present inventions, an improved tax lien categorization and rating system 300 is provided. The system 300 includes at least one computer 112a, with one or more databases 304, that are connected to a network 116 (such as the Internet). Computer 112a and databases(s) 304 are shown as system 306.

Computer 112a is adapted to communicate with a plurality of county government computing systems that include, for example, at least one county server 104 and at least one county tax lien database 108. Computer 112a can be coupled with a plurality of county servers 104 and a plurality of county tax lien databases 108 for various counties in various states across the country.

Computer 112a accesses, through network 116, county server 104/country database 108 and receives/downloads the county tax lien information including each of said plurality of tax liens. Computer 112a can also access/download other information related to the tax lien and/or related to the real property associated with the tax lien (such as whether the property is in bankruptcy or other information as described herein), from optional data bases 109 shown in FIG. 3. Computer 112a may periodically download such information, for instance daily, or may download such information when changes in the content of county tax lien database 108 and/or optional data bases 109 are detected. In one example, computer 112a categorizes the tax lien information, and determines one or more ratings of each of the tax liens.

In FIG. 3, one or more databases 304 are connected with computer 112a, wherein databases 304 are configured to store each of said one or more ratings associated with each tax lien, and also stores the categorized data of each tax lien.

Various categorizations and categorization protocols are described herein and some examples are shown in the form of example data Tables—and these data Table structures or variations thereof can be categorizations that can be implemented and stored using computer 112a and database 304.

The ratings of the tax liens, as well as the categorized tax lien information, are made accessible from the databases 304 over the network 116 (such as through a website provided by computer/server 112a and databases 304) to one or more third party computers 112b ... 112n, such as computers or mobile computing devices (e.g., smart phones or tablets) used by potential investors in such tax liens. These computers 112b ... 112n can download and search the information contained in databases 304, for instance through an internet browser accessing a website provided by computer/server 112a and databases 304, or through an application program configured to provide such information to computers 112b ... 112n. In this manner, this embodiment provides ratings of each tax lien across the country from various county governments across various states, and these ratings can be used by potential investors to analyze potential purchases of tax liens in different counties.

In one example, computer 112a utilizes a categorization protocol or hierarchy system to associate tax liens having similar underlying properties and/or investment characteristics. More particularly, a category value for tax liens may take into account a number of factors. For example, small liens may carry a larger risk associated with poor quality property. For institutional investors, this may be unattractive, and therefore, low on their hierarchy. On the other hand, such properties may be attractive for individuals that seek better returns because they are assuming more risk. (Better returns may be achieved in some jurisdictions by paying less of a premium for a tax lien.)

With reference to FIG. 3, the computing system 306 is adapted to categorize the tax liens into groups (and potentially smaller and smaller subgroups) for the benefit of one or more investors. One goal of a categorization protocol is to use a computer to automatically gather available tax lien information for counties, which could be further augmented with additional information from optional complimentary data bases 109 which could impact the relevant economic attractiveness or potential risks or liabilities associated with the underlying property (e.g., data bases containing information related to regional real property values for similar properties including resale statistics or a data base containing information regarding Environment Protection Agency (EPA) claims or other liabilities that would convey with the land underlying the tax lien) and then assigning a common category value to groups or subgroups of tax liens that share similar characteristics. Per FIG. 3, computer 112a utilizes a prioritization protocol to categorize tax liens and save them to a refined tax lien database 304.

In at least one embodiment, the refined tax lien database 304 is shared by computer 112a with other computers, such as second investor computer 112b and potentially a number of other investors through an Nth investor that may access and review the data via nth investor computer 112n that is interconnected via a network 116, such as the Internet.

Table 1 below provides a sampling of at least a portion of tax lien information that may be available from a county conducting a tax lien sale.

TABLE 1

Typical County Tax Lien Information

| County Tax Lien Property Identifier | Property Type Identifier | Assessed Land Value | Assessed Building Value | Tax Lien Amount |
|---|---|---|---|---|
| 000190 | Residence | $21,520 | $43,326 | $5,874 |
| 012493 | Residence | $7,353 | $11,781 | $1,469 |
| 018372 | Residence | $5,445 | $9,624 | $728 |
| 021066 | Residence | $5,738 | $7,721 | $559 |
| 024671 | Commercial | $64,235 | $161,501 | $18,738 |
| 028444 | Residence | $3,280 | $677 | $319 |
| 028503 | Residence | $398 | $2,690 | $286 |
| 059868 | Commercial | $48,111 | $340,750 | $37,076 |
| 148136 | Commercial | $501,990 | $2,007,844 | $51,168 |
| 159183 | Vacant Land | $17,038 | | $1,481 |
| 176742 | Residence | $3,937 | $10,109 | $1,287 |
| 192275 | Residence | $6,681 | $22,901 | $1,355 |
| 401958 | Residence | $5,978 | $14,201 | $1,848 |
| 409165 | Residence | $7,974 | $17,528 | $2,424 |
| 414541 | Residence | $6,730 | $20,139 | $1,230 |
| 453709 | Vacant Land | $27,370 | | $3,876 |
| 456120 | Vacant Land | $6,281 | | $598 |
| 456313 | Residence | | $91,669 | $10,724 |

The information includes a schedule number or county tax lien property identifier. This is the designation that the county uses for auctioning the tax lien. Some counties include a property type identifier, such as a designation indicating that the piece of land associated with the tax lien is "vacant land." The county may further include the assessed value of the land and buildings, as applicable. In addition, the county includes the amount of taxes due.

In one example, the improved tax lien system 306 assigns a category value to each tax lien that falls within a common subset. As noted above, different types of real property may represent different levels of investment risk and/or attractiveness (or lack thereof) for a possible rate of return for tax lien investors. Computer 112a accesses the county database 108 containing information pertaining to a plurality of tax liens that are indicated as available for purchase and possible optional complimentary data bases 109 to ascertain other relevant information. Thereafter, a common referenceable category scheme is developed, such as by taking a group of tax liens and subdividing the group into subgroups that share characteristics and assigning a common category value to that particular group. Criteria for assigning a common category value to a group can depend on a number of factors. In at least one embodiment, a set of criteria is used to assign a common category value to a group, wherein elements associated with the category value assigned to the group of tax liens would take into account factors that would lead to anticipated similar investment returns with "anticipated similar risk." The "anticipated similar risk" would involve shared characteristics, such as being associated with vacant land or associated with an occupied residence as well as additional information from optional complimentary data bases 109 for example pertaining to the existence of a mortgage on the property, land located in other geographic areas sharing similar resale, demand or economic conditions.

Various characteristics of tax liens may be obtained and analyzed by computer 112a as described herein, and may include factors as described herein, such as but not limited to, 1) Property Identification: the property identification utilized by the county (such as parcel number), and the street address of the property; 2) Owner: identification of the property owner, and the owner's mailing address; 3) Lien Amount: the minimum bid amount determined by the county, generally consisting of the tax amount due, penalties and/or interest, administrative costs, recording fees, and other similar costs incurred by the county in connection with the tax sale; 4) Interest and/or Penalty Rate: the interest rate and/or penalty rate due upon redemption, as set by statute; 5) Redemption Period: the period of time during which the lien may be redeemed, as set by statute; 6) Sale Method: the auction method used by the county at the tax sale, including but not limited to premium bid, bid down interest, bid down ownership, open bidding, rotational bidding, random bidding, and other methods or combinations of methods that may be identified; 7) Outstanding Tax Liens: whether the property is subject to outstanding county tax liens, and if so the number, amount, and age of the previously filed liens; 8) Assessed Property Value: the estimated value of the real property that the lien is placed against, which may be determined by the local government's assessor, a private appraisal entity, or other means. This may be further disaggregated into the value of the land, the value of any structures or other improvements on the land, the value of any mineral rights, etc.; 9) Property Area: the total area of the land that the lien is placed against; 10) Structure Area: the total floor area of any structures that are on the property; 11) Structure Age: the age of any structures or other improvements that are on the property; 12) Property Use: categorization of the property based on use, such as residential, commercial, agriculture, etc.; 13) Zoning: the current zoning classification for the property, as determined by the authority having jurisdiction; 14) Floodplain: whether the property, or a portion of the property, is within a 100 year floodplain as identified by the Federal Emergency Management Agency; 15) Subdivision: whether the property is within a subdivision recognized by the county; 16) Mortgages: whether there is a mortgage on the property, and if so the amount; 17) Federal Tax Liens: whether the property is subject to federal tax liens, and if so the number, amount, and age of the previously filed liens; 18) State Tax Liens: whether the property is subject to state tax liens, and if so the number, amount, and age of the previously filed liens; 19) Federal Environmental Protection Agency Liens: whether the property is subject to federal Environmental Protection Agency liens, and if so the number, amount, and age of the previously filed liens; 20) State Environmental Protection Agency Liens: whether the property is subject to state environmental protection agency liens, and if so the number, amount, and age of the previously filed liens; 21) Bankruptcy: whether the owner is in the process of bankruptcy; 22) Minimum Value: either a minimum lien value, or a minimum property assessment value; and/or 23) Lien to Value Ratio: the ratio of the lien amount to the assessed property value. Computer 112a may store this information in association with each tax lien in database 304, so that this information is made available to third-party computers over the network.

By way of example, in at least one embodiment the criteria for categorizing the tax liens for purchase depends upon (1) the type land (e.g., vacant land, residential, commercial) and (2) the assessed value for the land and/or building, as applicable. For the properties listed in Table 1, criteria are used to first categorize liens based on the nature of the land use in one example. Table 2 lists those tax liens whose associated properties are residences.

TABLE 2

Residential Property Grouping

| County Tax Lien Property Identifier | Property Type Identifier | Assessed Land Value | Assessed Building Value | Tax Lien Amount |
|---|---|---|---|---|
| 000190 | Residence | $21,520 | $43,326 | $5,874 |
| 012493 | Residence | $7,353 | $11,781 | $1,469 |
| 018372 | Residence | $5,445 | $9,624 | $728 |
| 021066 | Residence | $5,738 | $7,721 | $559 |
| 028444 | Residence | $3,280 | $677 | $319 |
| 028503 | Residence | $398 | $2,690 | $286 |
| 176742 | Residence | $3,937 | $10,109 | $1,287 |
| 192275 | Residence | $6,681 | $22,901 | $1,355 |
| 401958 | Residence | $5,978 | $14,201 | $1,848 |
| 409165 | Residence | $7,974 | $17,528 | $2,424 |
| 414541 | Residence | $6,730 | $20,139 | $1,230 |
| 456313 | Residence | | $91,669 | $10,724 |

As can be seen in Table 2, after a first filtering of the available tax liens, the use of a residence property filter removes the vacant land and commercial property related tax liens. A second filtering is then performed. One possible filtering criteria is to categorize the properties into subgroups based upon assessed building value. By way of example, three groups are generated, those with building assessed values within the following ranges:

(a) below $5,000;

(b) between $5000 to $20,000; and (c) above $20,000.

Of course, that actual values used for establishing the groups will vary with the jurisdiction and will also take into consideration other criteria, such as, by way of non-limiting example, the existing national, regional and local economic conditions as may be made available from optional complimentary data bases 109.

Tables 3(a)-3(c) list the tax liens using the example filter criteria given directly above for the assessed building value.

TABLE 3(a)

Residential Property Grouping (Assessed Building Value < $5,000)

| County Tax Lien Property Identifier | Property Type Identifier | Assessed Land Value | Assessed Building Value | Tax Lien Amount |
|---|---|---|---|---|
| 028444 | Residence | $3,280 | $677 | $319 |
| 028503 | Residence | $398 | $2,690 | $286 |

TABLE 3(b)

Residential Property Grouping ($5,000 ≤ Assessed Building Value < $20,000)

| County Tax Lien Property Identifier | Property Type Identifier | Assessed Land Value | Assessed Building Value | Tax Lien Amount |
|---|---|---|---|---|
| 012493 | Residence | $7,353 | $11,781 | $1,469 |
| 018372 | Residence | $5,445 | $9,624 | $728 |
| 021066 | Residence | $5,738 | $7,721 | $559 |
| 176742 | Residence | $3,937 | $10,109 | $1,287 |
| 401958 | Residence | $5,978 | $14,201 | $1,848 |
| 409165 | Residence | $7,974 | $17,528 | $2,424 |

TABLE 3(c)

Residential Property Grouping (Assessed Building Value ≥ $20,000)

| County Tax Lien Property Identifier | Property Type Identifier | Assessed Land Value | Assessed Building Value | Tax Lien Amount |
|---|---|---|---|---|
| 000190 | Residence | $21,520 | $43,326 | $5,874 |
| 192275 | Residence | $6,681 | $22,901 | $1,355 |
| 414541 | Residence | $6,730 | $20,139 | $1,230 |
| 456313 | Residence | | $91,669 | $10,724 |

Depending upon the sensitivity to risk, for tens, hundreds or thousands of tax liens, further filtering may be performed to arrive at additional criteria and associated assigned category values. For example, additional filters may be applied to each of Tables 3(a)-3(c) using criteria for the assessed land value and/or the tax lien amount. By way of example, two further categories can be generated comprised of tax lien properties having tax lien amounts within the following ranges:

(a) below $1,500; and (b) at or above $1,500.

Tables 4(a)(i)-4(c)(ii) list the tax liens using the example filter criteria given directly above for the amount of the tax lien.

TABLE 4(a)(i)

Residential Property Grouping (Assessed Building Value < $5,000 and Tax Lien Amount < $1,500)

| County Tax Lien Property Identifier | Property Type Identifier | Assessed Land Value | Assessed Building Value | Tax Lien Amount |
|---|---|---|---|---|
| 028444 | Residence | $3,280 | $677 | $319 |
| 028503 | Residence | $398 | $2,690 | $286 |

TABLE 4(a)(ii)

Residential Property Grouping (Assessed Building Value < $5,000 and Tax Lien Amount ≥ $1,500)

| County Tax Lien Property Identifier | Property Type Identifier | Assessed Land Value | Assessed Building Value | Tax Lien Amount |
|---|---|---|---|---|
| None | | | | |

TABLE 4(b)(i)

Residential Property Grouping ($5,000 ≤ Assessed Building Value < $20,000 and Tax Lien Amount < $1,500)

| County Tax Lien Property Identifier | Property Type Identifier | Assessed Land Value | Assessed Building Value | Tax Lien Amount |
|---|---|---|---|---|
| 012493 | Residence | $7,353 | $11,781 | $1,469 |
| 018372 | Residence | $5,445 | $9,624 | $728 |
| 021066 | Residence | $5,738 | $7,721 | $559 |
| 176742 | Residence | $3,937 | $10,109 | $1,287 |

TABLE 4(b)(ii)

Residential Property Grouping ($5,000 ≤ Assessed Building Value < $20,000 and Tax Lien Amount ≥ $1,500)

| County Tax Lien Property Identifier | Property Type Identifier | Assessed Land Value | Assessed Building Value | Tax Lien Amount |
|---|---|---|---|---|
| 401958 | Residence | $5,978 | $14,201 | $1,848 |
| 409165 | Residence | $7,974 | $17,528 | $2,424 |

TABLE 4(c)(i)

Residential Property Grouping (Assessed Building Value ≥ $20,000 and Tax Lien Amount < $1,500)

| County Tax Lien Property Identifier | Property Type Identifier | Assessed Land Value | Assessed Building Value | Tax Lien Amount |
|---|---|---|---|---|
| 192275 | Residence | $6,681 | $22,901 | $1,355 |
| 414541 | Residence | $6,730 | $20,139 | $1,230 |

TABLE 4(c)(ii)

Residential Property Grouping (Assessed Building Value ≥ $20,000 and Tax Lien Amount ≥ $1,500)

| County Tax Lien Property Identifier | Property Type Identifier | Assessed Land Value | Assessed Building Value | Tax Lien Amount |
|---|---|---|---|---|
| 000190 | Residence | $21,520 | $43,326 | $5,874 |
| 456313 | Residence | | $91,669 | $10,724 |

If the desirability of the subsets of tax liens is assigned after the categorization process, then standard category values can be assigned for use in computerized purchasing of tax liens. The categorization may be based on a statistical analysis of the investment return associated with various filter criteria. The categorization may account for not only adjustments to account for risk, but likely average return on investment. For example, tax liens from the Tables 4(a)(i)-4(c)(ii) could be categorized as follows:

TABLE 5(a)

Summary of a Possible Tax Lien Hierarchy

| Category Value | Hierarchy of Desirable Tax Liens on Residential Properties |
|---|---|
| IR1 | Table 4(c)(ii) [most desirable] |
| IR2 | Table 4(b)(ii) |
| IR3 | Table 4(c)(i) |
| IR4 | Table 4(b)(i) |
| IR5 | Table 4(a)(ii) |
| IR6 | Table 4(a)(i) [least desirable] |

For institutional investors, the hierarchy of category value shown in Table 5(a) may be attractive. On the other hand, personal investors seeking better returns (by paying a smaller premium for the tax lien) may find the hierarchy of category values in Table 5(a) unattractive. They may be willing to take greater risk by paying a smaller premium for a riskier property to obtain the opportunity for a better return. Accordingly, they may prefer the category shown below in Table 5(b).

TABLE 5(b)

Summary of an Alternative Possible Tax Lien Hierarchy

| Category Value | Hierarchy of Desirable Tax Liens on Residential Properties |
|---|---|
| PR1 | Table 4(a)(i) [most desirable] |
| PR2 | Table 4(b)(i) |
| PR3 | Table 4(a)(ii) |
| PR4 | Table 4(b)(ii) |
| PR5 | Table 4(c)(i) |
| PR6 | Table 4(c)(ii) [least desirable] |

A similar categorization scheme can be used to establish groups and subgroups for tax liens associated with commercial property and vacant land. Per the example tax lien listing shown in Table 2 above, Tables 6 and 7 list the tax liens for those commercial land and vacant land properties, respectively.

TABLE 6

Commercial Property Grouping

| County Tax Lien Property Identifier | Property Type Identifier | Assessed Land Value | Assessed Building Value | Tax Lien Amount |
|---|---|---|---|---|
| 024671 | Commercial | $64,235 | $161,501 | $18,738 |
| 059868 | Commercial | $48,111 | $340,750 | $37,076 |
| 148136 | Commercial | $501,990 | $2,007,844 | $51,168 |

TABLE 7

Vacant Land Grouping

| County Tax Lien Property Identifier | Property Type Identifier | Assessed Land Value | Assessed Building Value | Tax Lien Amount |
|---|---|---|---|---|
| 159183 | Vacant Land | $17,038 | | $1,481 |
| 453709 | Vacant Land | $27,370 | | $3,876 |
| 456120 | Vacant Land | $6,281 | | $598 |

Similar but adjusted criteria can be used to associate category values to tax liens in both of the commercial property and vacant land property groups which have similar underlying properties and/or investment characteristics. Again, the actual category value associated with each lien will vary with the jurisdiction and should also take into consideration other criteria, such as, by way of non-limiting example, the existing national, regional and local economic conditions which can be made available from optional complimentary data bases 109. For example, properties in New York City will likely have different criteria and ranges than properties in rural Nebraska. FIG. 4 provides a potential characteristic scheme 400 for forming groups and subgroups of tax liens based an assessed value for the property and the amount of the tax lien involved. The values of X, Y, X', Y', X", and Y" would vary for a given county, and potentially for different locations within a given county. Accordingly, categorization criteria can be customized for specific groups of investors, land type, location and the like.

In the non-limiting example provided in FIG. 4, the letter designations R, C and V represent three different potential categories—R=Residential, C=Commercial and V=Vacant land and numerical identifiers following each of the letter designations represent more granular sub-categories within each of the R, C and V categories based on more detailed information. For example, in the non-limiting example provided in FIG. 4, the tax lien category identifier "R1" represents a tax lien assessed on a residential property having an assessed value less than X with a tax lien less than $1,500 whereas the tax lien identifier "C3" represents a tax lien assessed on a commercial property having an assessed value of between X' and Y' with a tax lien less than $5,000. Whereas, the non-limiting example of tax lien categorization provided in FIG. 4, involves three variables—(i) the type of property (Residential, Commercial or Vacant), (ii) the assessed value of the property/land and (iii) the amount of the tax lien, additional variables could also be factored into assigning a final sub-category tax lien designation such as, for example, (x) the average length of time that the subject category of property/land in question remains on the market before being sold in the subject geographic area, (y) the existence of current tax liens on additional properties owned by the same legal owner of specified property/land underlying a tax lien, or (z) past activity by the same legal owner of specified property/land underlying a tax lien in paying off tax liens.

In this manner, tax lien sub-categorizations may be assigned to different property/land types representing multiple factors associated with the underlying property/land type and associated tax lien in a manner that would facilitate identification of the combination of numerous underlying factors by means of reference to the sub-categorization identifier itself. In turn, this would facilitate more accurate comparison between and among tax liens within the same and across disparate geographic regions by enabling interested parties to reference specific sub-categorization identifiers associated with tax liens rather than requiring that each interested party independently analyze the underlying factors themselves.

Stated differently, in one example, computer 112a analyzes the tax lien information for each tax lien and categorizes the tax lien according to one or more factors as disclosed herein. Computer 112a can also determine a rating for each tax lien, wherein the rating is based on one or more characteristics of the tax lien and/or is based on one or more characteristics of the real property associated with the tax lien. For instance, as shown in the example of FIG. 4, a rating may be expressed as R1 to indicate a tax lien related to a residential property where the assessed value of the property is less than some value X and where the tax lien is less than $1500; a rating may be expressed as R2 to indicate a tax lien related to a residential property where the assessed value of the property is less than some value X and where the tax lien is greater than $1500; a rating may be expressed as R3 to indicate a tax lien related to a residential property where the assessed value of the property is greater than some value X but less than some value Y, and where the tax lien is less than $1500; a rating may be expressed as R4 to indicate a tax lien related to a residential property where the assessed value of the property is greater than some value X but less than some value Y, and where the tax lien is greater than $1500; a rating may be expressed as R5 to indicate a tax lien related to a residential property where the assessed value of the property is greater than some value Y and where the tax lien is less than $1500; a rating may be expressed as R6 to indicate a tax lien related to a residential property where the assessed value of the property is greater than some value Y and where the tax lien is greater than $1500.

As shown in example of FIG. 4, other ratings such as C1, C2, C3, C4, C5, C6 can be formulated in a similar manner for commercial properties; and ratings such as V1, V2, V3, V4, V5, V6 can be formulated for vacant land. It is understood that these ratings are provided by way of example only. Other ratings can be used and formulated based on the numerous factors and characteristics as described herein, depending upon the particular implementation of the invention.

By way of example only, assume that a tax lien in the county of Denver Colo. exists on a residential property having an assessed value less than $100,000 where the tax lien amount is $978 which less than $1500—in this example, the computer 112a could determine that this tax lien is rated R1. Assume that a tax lien in Franklin county Ohio exists on a residential property having an assessed value less than $100,000 where the tax lien amount is $912 which less than $1500—in this example, the computer 112a could determine that this tax lien is rated R1. Assume that a tax lien in Duval county Florida exists on a residential property having an assessed value less than $100,000 where the tax lien amount is $934 which less than $1500—in this example, the computer 112a could determine that this tax lien is rated R1. Computer 112a obtains this tax lien information and categorizes the tax lien information for each lien, and computer 112a provides ratings for each tax lien and stores this information in database 304. Through the system 306 in FIG. 3, this information is made available over the Internet 116 for analysis by third-party computers 112b . . . 112n by potential investors. In this manner, a potential investor interested in possibly purchasing tax liens in Denver, Columbus and Jacksonville that have the characteristics of an "R1" rating can easily locate these tax lien purchase opportunities using embodiments of the present invention.

Tax Lien System Including Groups of Tax Liens

The present inventors recognize that different types of real properties represent different levels of investment risk and/or investment opportunity for tax lien investors. That is, although the percent return on a $1000 tax lien may theoretically be the same for a piece of residential property or vacant land within a given state, the present inventors recognize that the risk and actual rate of return varies with the type of property involved. For example, a piece of real property with a house on it may represent a first category of risk or rate of return. A piece of land that is a vacant lot with no improvements on it may represent a second category of risk or rate of return. Yet another piece of real property with a commercial building on it may represent yet a third category of risk or rate of return. Such properties are understood by the present inventors to have variable risk or rate of return because owners of certain property types are more likely to pay the taxes during different time horizons on the property than on other types of properties. By way of example, and assuming other factors being substantially equal, a piece of real property with an improvement is more likely to have its tax liens paid than a piece of vacant land. To carry this example further, a piece of real property with a homestead (occupied residence) is more likely to have its tax liens paid off than a vacant piece of land. The real property serves to secure the tax lien. Moreover, the present inventors recognize that tax liens are sought after because the returns on investments are not only secured by the associated real property, but for most jurisdictions, banks holding mortgages on the real property are set at a lower priority in the secured chain and therefore the banks are likely to ensure payment of unpaid tax liens prior to foreclosure on the property due to failure to pay tax liens. Accordingly, with many types of investment returns being relatively low, some investors consider purchasing tax liens to be an attractive investment. Lastly, different geographic regions of the country may have stronger real property markets with greater demand thereby increasing the potential value that can be realized upon the sale of real property underlying a tax lien if the tax lien is not redeemed and also reducing the likely time necessary to carry the property on the market prior to receiving acceptable offers to purchase the property.

FIG. 1 illustrates a system 100 showing how some counties make tax lien information available to the public. More specifically, one or more counties currently provide a computer or server 104 that is connected to a tax lien database 108 that includes data from the county tax lien system. One or more investors can access at least some of the data using a networked computer, such as a first computer 112a, second computer 112b, through an nth computer 112n. Such computers are interconnected to the Internet via network 116 such that the investors can review the county tax lien information.

In addition, some counties currently allow bidding for the tax liens to occur over the Internet. FIG. 2 illustrates an October 2011 tax lien system 200 accessible over the Internet for Jefferson County, Colorado. However, the tax liens are not organized into groups or subsets that can be directly bid on by the investors. That is, while the property listing may include an identifier showing that the tax lien is associated with a piece of vacant land, tax liens from multiple pieces of vacant land owned by different owners are not available to be purchased as a group, nor are the tax liens organized into a hierarchy or groups based on a preference for limiting risk and/or the desirability of a one group of tax liens over another.

Figure 5:
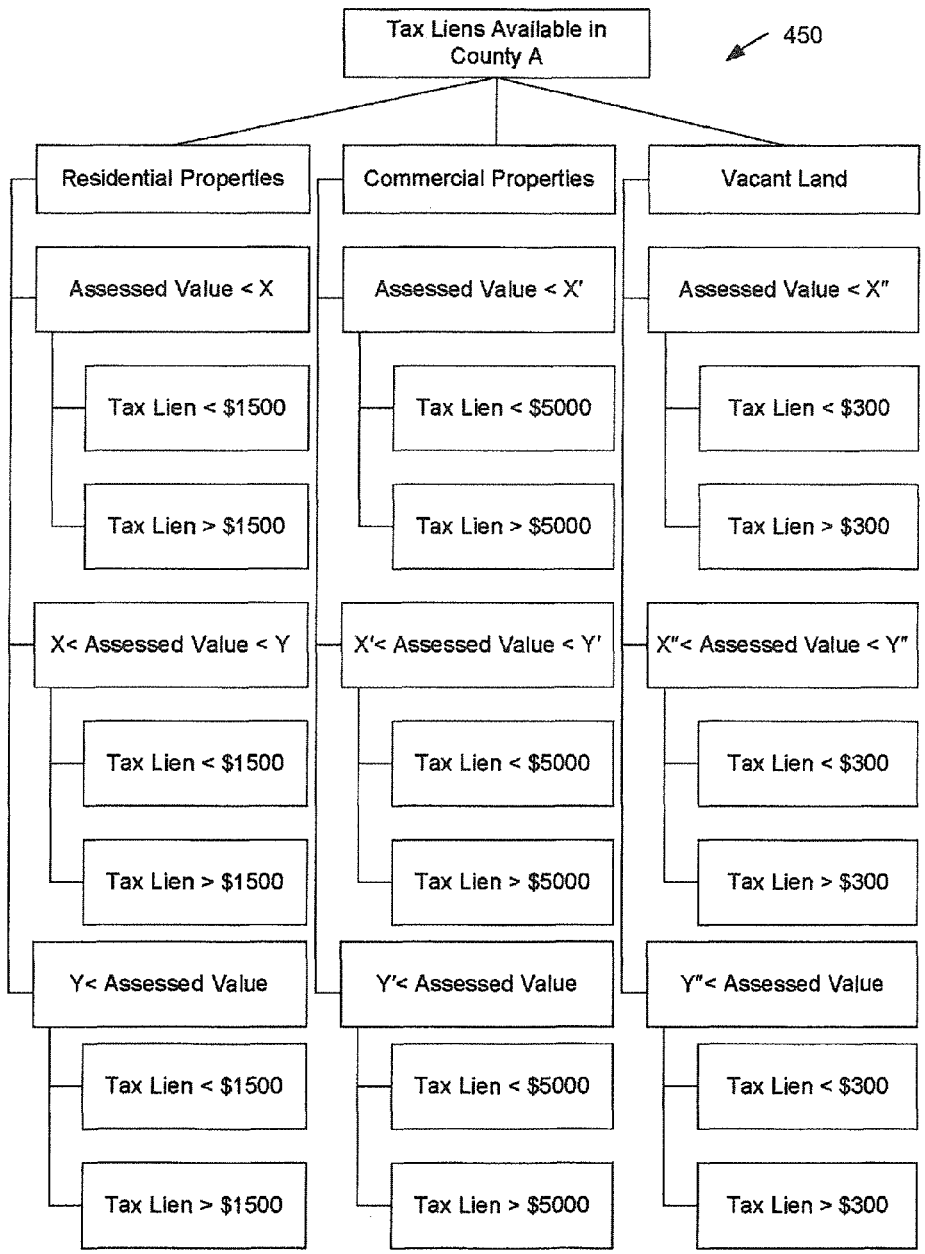
FIG. 5 is an embodiment of possible categorization groups for tax liens, in accordance with an embodiment of the present invention.

Accordingly, and with reference now to FIGS. 3 and 5, in at least one embodiment of the one or more present inventions, an improved tax lien categorization system 300 is provided. In one example, system 306 utilizes a hierarchy system to place tax liens into groups or subsets based on chosen prioritization criteria. More particularly, a hierarchy of tax liens may take into account a number of factors. For example, small liens may carry a larger risk associated with poor quality property. For institutional investors, this may be unattractive, and therefore, low on their hierarchy. On the other hand, such properties may be attractive for individuals that seek better returns because they are assuming more risk. (Better returns may be achieved in some jurisdictions by paying less of a premium for a tax lien.)

With reference to FIG. 3, the computing system 306 categorizes the tax liens into groups (and potentially smaller and smaller subgroups). In one example, one goal of the categorization protocol is to use computer to 112a automatically gather available tax lien information for counties across the United States, and then build groups or subgroups of targeted tax liens for investment. Per FIG. 3, computer 112a utilizes a prioritization protocol to categorize tax liens and save them to a refined tax lien database 304.

In at least one embodiment, the refined tax lien database 304 is shared by the computer 112a with others, such as second investor computer 112b and potentially a number of other investors through an Nth investor that may access and review the data via nth investor computer 112n that is interconnected via a network 116, such as the Internet.

Table 8 below provides a sampling of at least a portion of tax lien information that may be available from a county conducting a tax lien sale.

TABLE 8

Typical County Tax Lien Information

| County Tax Lien Property Identifier | Property Type Identifier | Assessed Land Value | Assessed Building Value | Tax Lien Amount |
|---|---|---|---|---|
| 000190 | Residence | $21,520 | $43,326 | $5,874 |
| 012493 | Residence | $7,353 | $11,781 | $1,469 |
| 018372 | Residence | $5,445 | $9,624 | $728 |

TABLE 8-continued

Typical County Tax Lien Information

| County Tax Lien Property Identifier | Property Type Identifier | Assessed Land Value | Assessed Building Value | Tax Lien Amount |
|---|---|---|---|---|
| 021066 | Residence | $5,738 | $7,721 | $559 |
| 024671 | Commercial | $64,235 | $161,501 | $18,738 |
| 028444 | Residence | $3,280 | $677 | $319 |
| 028503 | Residence | $398 | $2,690 | $286 |
| 059868 | Commercial | $48,111 | $340,750 | $37,076 |
| 148136 | Commercial | $501,990 | $2,007,844 | $51,168 |
| 159183 | Vacant Land | $17,038 | | $1,481 |
| 176742 | Residence | $3,937 | $10,109 | $1,287 |
| 192275 | Residence | $6,681 | $22,901 | $1,355 |
| 401958 | Residence | $5,978 | $14,201 | $1,848 |
| 409165 | Residence | $7,974 | $17,528 | $2,424 |
| 414541 | Residence | $6,730 | $20,139 | $1,230 |
| 453709 | Vacant Land | $27,370 | | $3,876 |
| 456120 | Vacant Land | $6,281 | | $598 |
| 456313 | Residence | | $91,669 | $10,724 |

The information includes a schedule number or county tax lien property identifier. This is the designation that the county uses for auctioning the tax lien. Some counties include a property type identifier, such as a designation indicating that the piece of land associated with the tax lien is "vacant land." The county may further include the assessed value of the land and buildings, as applicable. In addition, the county includes the amount of taxes due.

The improved tax lien system 306 includes characterizing each tax lien into a subset in one example. As noted above, different types of real property may represent different levels of investment risk and/or attractiveness (or lack thereof) for a possible rate of return for tax lien investors. In one example, computer 112a accesses the county database 108 containing information pertaining to a plurality of tax liens that are indicated as available for purchase, and downloads the tax lien information. A pool of tax liens can be formed, such as by taking a group of tax liens and subdividing the group into subgroups, or by taking two or more subgroups and forming a larger group. Criteria for forming a subgroup or larger group can depend on a number of factors. In at least one embodiment, a set of criteria is used to establish a subgroup, wherein elements of the subgroup include tax liens having similar investment returns with "anticipated similar risk." The "anticipated similar risk" may be categories of tax liens that share certain characteristics, such as being associated with vacant land, or properties with an occupied residence as well as additional information from optional complimentary data bases 109 for example pertaining to the existence of a mortgage on the property, land located in other geographic areas sharing similar resale, demand or economic conditions.

By way of example, in one embodiment, the criteria for categorizing the tax liens for purchase depends upon (1) the type land (e.g., vacant land, residential, commercial) and (2) the assessed value for the land and or building, as applicable. For the properties listed in Table 8, categorization criteria are used to first form groups based the nature of the land use. Table 9 lists those tax liens whose associated properties are residences.

TABLE 9

Residential Property Grouping

| County Tax Lien Property Identifier | Property Type Identifier | Assessed Land Value | Assessed Building Value | Tax Lien Amount |
|---|---|---|---|---|
| 000190 | Residence | $21,520 | $43,326 | $5,874 |
| 012493 | Residence | $7,353 | $11,781 | $1,469 |
| 018372 | Residence | $5,445 | $9,624 | $728 |
| 021066 | Residence | $5,738 | $7,721 | $559 |
| 028444 | Residence | $3,280 | $677 | $319 |
| 028503 | Residence | $398 | $2,690 | $286 |
| 176742 | Residence | $3,937 | $10,109 | $1,287 |
| 192275 | Residence | $6,681 | $22,901 | $1,355 |
| 401958 | Residence | $5,978 | $14,201 | $1,848 |
| 409165 | Residence | $7,974 | $17,528 | $2,424 |
| 414541 | Residence | $6,730 | $20,139 | $1,230 |
| 456313 | Residence | | $91,669 | $10,724 |

As can be seen in the example of Table 9, after a first filtering of the available tax liens, the use of a residence property filter removes the vacant land and commercial property related tax liens. A second filtering is then performed. One possible filtering criteria is to categorize the properties into subgroups based upon assessed building value. By way of example, three groups are generated, those with building assessed values within the following ranges:

(a) below $5,000;

(b) between $5000 to $20,000; and (c) above $20,000.

Of course, that actual values used for establishing the groups will vary with the jurisdiction and will also take into consideration other criteria, such as, by way of non-limiting example, the existing national, regional and local economic conditions as may be available from optional complimentary databases 109.

Tables 10(a)-10(c) list the tax liens using the example filter criteria given directly above for the assessed building value.

TABLE 10(a)

Residential Property Grouping (Assessed Building Value < $5,000)

| County Tax Lien Property Identifier | Property Type Identifier | Assessed Land Value | Assessed Building Value | Tax Lien Amount |
|---|---|---|---|---|
| 028444 | Residence | $3,280 | $677 | $319 |
| 028503 | Residence | $398 | $2,690 | $286 |

TABLE 10(b)

Residential Property Grouping ($5,000 ≤ Assessed Building Value < $20,000)

| County Tax Lien Property Identifier | Property Type Identifier | Assessed Land Value | Assessed Building Value | Tax Lien Amount |
|---|---|---|---|---|
| 012493 | Residence | $7,353 | $11,781 | $1,469 |
| 018372 | Residence | $5,445 | $9,624 | $728 |
| 021066 | Residence | $5,738 | $7,721 | $559 |
| 176742 | Residence | $3,937 | $10,109 | $1,287 |
| 401958 | Residence | $5,978 | $14,201 | $1,848 |
| 409165 | Residence | $7,974 | $17,528 | $2,424 |

TABLE 10(c)

Residential Property Grouping (Assessed Building Value ≥ $20,000)

| County Tax Lien Property Identifier | Property Type Identifier | Assessed Land Value | Assessed Building Value | Tax Lien Amount |
|---|---|---|---|---|
| 000190 | Residence | $21,520 | $43,326 | $5,874 |
| 192275 | Residence | $6,681 | $22,901 | $1,355 |
| 414541 | Residence | $6,730 | $20,139 | $1,230 |
| 456313 | Residence |  | $91,669 | $10,724 |

Depending upon the sensitivity to risk, for tens, hundreds or thousands of tax liens, further filtering may be performed to arrive at additional subsets. For example, additional filters may be applied to each of Tables 10(a)-10(c) using criteria for the assessed land value and/or the tax lien amount. By way of example, two further subgroups can be generated for those tax lien properties having tax lien amounts within the following ranges:

(a) below $1,500; and (b) at or above $1,500.

Tables 11(a)(i)-11(c)(ii) list the tax liens using the example filter criteria given directly above for the amount of the tax lien.

TABLE 11(a)(i)

Residential Property Grouping (Assessed Building Value < $5,000 and Tax Lien Amount < $1,500)

| County Tax Lien Property Identifier | Property Type Identifier | Assessed Land Value | Assessed Building Value | Tax Lien Amount |
|---|---|---|---|---|
| 028444 | Residence | $3,280 | $677 | $319 |
| 028503 | Residence | $398 | $2,690 | $286 |

TABLE 11(a)(ii)

Residential Property Grouping (Assessed Building Value < $5,000 and Tax Lien Amount ≥ $1,500)

| County Tax Lien Property Identifier | Property Type Identifier | Assessed Land Value | Assessed Building Value | Tax Lien Amount |
|---|---|---|---|---|

None

TABLE 11(b)(i)

Residential Property Grouping ($5,000 ≤ Assessed Building Value < $20,000 and Tax Lien Amount < $1,500)

| County Tax Lien Property Identifier | Property Type Identifier | Assessed Land Value | Assessed Building Value | Tax Lien Amount |
|---|---|---|---|---|
| 012493 | Residence | $7,353 | $11,781 | $1,469 |
| 018372 | Residence | $5,445 | $9,624 | $728 |
| 021066 | Residence | $5,738 | $7,721 | $559 |
| 176742 | Residence | $3,937 | $10,109 | $1,287 |

TABLE 11(b)(ii)

Residential Property Grouping ($5,000 ≤ Assessed Building Value < $20,000 and Tax Lien Amount ≥ $1,500)

| County Tax Lien Property Identifier | Property Type Identifier | Assessed Land Value | Assessed Building Value | Tax Lien Amount |
|---|---|---|---|---|
| 401958 | Residence | $5,978 | $14,201 | $1,848 |
| 409165 | Residence | $7,974 | $17,528 | $2,424 |

TABLE 11(c)(i)

Residential Property Grouping (Assessed Building Value ≥ $20,000 and Tax Lien Amount < $1,500)

| County Tax Lien Property Identifier | Property Type Identifier | Assessed Land Value | Assessed Building Value | Tax Lien Amount |
|---|---|---|---|---|
| 192275 | Residence | $6,681 | $22,901 | $1,355 |
| 414541 | Residence | $6,730 | $20,139 | $1,230 |

TABLE 11(c)(ii)

Residential Property Grouping (Assessed Building Value ≥ $20,000 and Tax Lien Amount ≥ $1,500)

| County Tax Lien Property Identifier | Property Type Identifier | Assessed Land Value | Assessed Building Value | Tax Lien Amount |
|---|---|---|---|---|
| 000190 | Residence | $21,520 | $43,326 | $5,874 |
| 456313 | Residence |  | $91,669 | $10,724 |

If the desirability of the subsets of tax liens is assigned after the filtering process, then a hierarchy is available for use in computerized purchasing of tax liens. The desirability may be based on a statistical analysis of the investment return associated with various filter criteria. The desirability may account for not only adjustments to account for risk, but likely average return on investment. For example, tax liens from the Tables 11(a)(i)-11(c)(ii) may be ranked as follows:

TABLE 12(a)

Summary of a Possible Tax Lien Hierarchy

Hierarchy of Desirable Tax Liens on Residential Properties

Table 11 (c)(ii) [most desirable]
Table 11 (b)(ii)
Table 11 (c)(i)
Table 11 (b)(i)
Table 11 (a)(ii)
Table 11 (a)(i) [least desirable]

For institutional investors, the hierarchy shown in Table 12(a) may be attractive. On the other hand, individual investors seeking better returns (by paying a smaller premium for the tax lien) may find the hierarchy in Table 12(a) unattractive. They may be willing to take greater risk by paying a smaller premium for a riskier property to obtain the opportunity for a better return. Accordingly, they may prefer the hierarchy shown below in Table 12(b).

TABLE 12(b)

Summary of an Alternative Possible Tax Lien Hierarchy

Hierarchy of Desirable Tax Liens on Residential Properties

Table 11 (a)(i) [most desirable]
Table 11 (b)(i)
Table 11 (a)(ii)
Table 11 (b)(ii)
Table 11 (c)(i)
Table 11 (c)(ii) [least desirable]

A similar protocol can be used to establish groups and subgroups for tax liens associated with commercial property and vacant land. Per the example tax lien listing shown in Table 9 above, Tables 13 and 14 list the tax liens for those commercial land and vacant land properties, respectively.

TABLE 13

Commercial Property Grouping

| County Tax Lien Property Identifier | Property Type Identifier | Assessed Land Value | Assessed Building Value | Tax Lien Amount |
|---|---|---|---|---|
| 024671 | Commercial | $64,235 | $161,501 | $18,738 |
| 059868 | Commercial | $48,111 | $340,750 | $37,076 |
| 148136 | Commercial | $501,990 | $2,007,844 | $51,168 |

TABLE 14

Vacant Land Grouping

| County Tax Lien Property Identifier | Property Type Identifier | Assessed Land Value | Assessed Building Value | Tax Lien Amount |
|---|---|---|---|---|
| 159183 | Vacant Land | $17,038 | | $1,481 |
| 453709 | Vacant Land | $27,370 | | $3,876 |
| 456120 | Vacant Land | $6,281 | | $598 |

Similar but adjusted criteria can be used to establish a hierarchy for the tax liens in both of the commercial property and vacant land property groups. Again, the actual values used for establishing the groups will vary with the jurisdiction and should also take into consideration other criteria, such as, by way of non-limiting example, the existing national, regional and local economic conditions which can be made available from optional complimentary data bases 109. For example, properties in New York City will likely have different criteria and ranges than properties in rural Nebraska. FIG. 5 provides a hierarchy 450 for forming groups and subgroups of tax liens based an assessed value for the property and the amount of the tax lien involved. The values of X, Y, X', Y', X", and Y" would vary for a given county, and potentially for different locations within a given county. Accordingly, categorization criteria can be customized for specific groups of investors, land type, location and the like. Whereas, the non-limiting example of a tax lien hierarchy provided in FIG. 5, involves three variables—(i) the type of property (Residential, Commercial or Vacant), (ii) the assessed value of the property/land and (iii) the amount of the tax lien, additional variables could also be factored into determining a tax lien hierarchy such as, for example, (x) the average length of time that the subject category of property/land in question remains on the market before being sold in the subject geographic area, (y) the existence of current tax liens on additional properties owned by the same legal owner of specified property/land underlying a tax lien, or (z) past activity by the same legal owner of specified property/land underlying a tax lien in paying off tax liens. In this manner, a tax lien hierarchy representing multiple factors associated with the underlying property/land type and associated tax lien could facilitate more accurate comparison between and among tax liens within the same and across disparate geographic regions.

Third Party Categorizer

Figure 6:
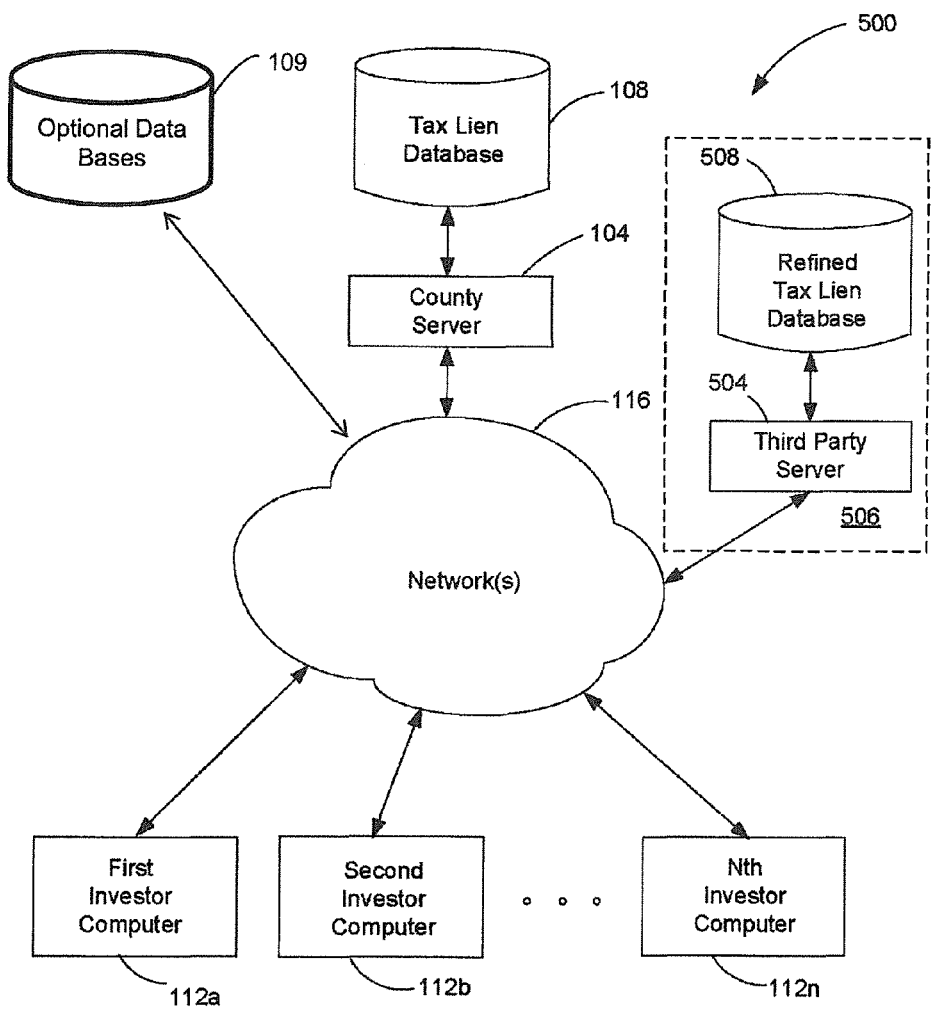
FIG. 6 is another block diagram depicting network architecture of a computerized tax lien information system using a third party organizer computer system in accordance with at least one embodiment of the one or more present inventions.

Referring now to FIG. 6, in an alternative embodiment, a tax lien categorization system 500 is shown. The system is similar to the system of FIG. 3; and in FIG. 6, the tax lien categorization system 500 includes a third party organizer system 506, which can be implemented for instance by a person or entity that is not an investor and not the county. In one example, system 506 includes at least one computer 504 and at least one database 508. System 506 accesses, through network 116 such as the Internet, the county server 104, tax lien database 108 and optional complimentary data bases 109. System 506 assigns category and sub-category values and ratings to the tax liens based on common characteristics in a manner as described above in the context of FIG. 3-5, and thereafter, the category and sub-category values are maintained in database 508 and are made available for access by and searching by third-parties using investor computers 112a-112n.

Thereafter, investors can purchase the tax liens, such as through an online auction system, and the common category and sub-category values will enable a broader audience to potentially participate in the process since detailed review of information associated with each tax lien and/or its underlying real property will not be required since the various category and sub-category values will represent specific combinations of relevant characteristics and criteria. Here, it is noted that the county itself could undertake to categorize the tax liens into groups or subsets, in one embodiment of the invention. However, use of a third party computer system 506 that includes information for multiple counties provides a greater referenceable data base of tax liens and therefore greater opportunities for investors; in addition, it provides a level of separation between the county and the entity assigning category values to groups or subgroups of tax liens as presented herein.

State and County Adoption

In at least one embodiment of the one or more present inventions, a least one county adopts a group sale approach of some tax liens as categorized by either the county itself, or by a third party organizer. The county could choose one or more categorization hierarchy for categorizing its tax liens. By way of example and not limitation, the groups of tax liens could be constructed such that at least some of the groups are attractive to institutional investors. For example, the tax liens pertaining to residential properties may be organized in groups such as those shown in Tables 11(a)(i)-11(c)(ii). Alternatively, mixing of property types could be included, such as by including the highest ranked tax liens for institutional investors from all property types (residential, commercial and vacant land) into a single group, with lesser attractive groups organized in a similar fashion.

In one alternative grouping scenario, a vast majority of highly attractive tax liens are placed in a group with a number of vacant land tax liens that have property characteristics unsuitable for any normal or reasonable type of building. Under this scheme, if an institutional investor wishes to obtain the most attractive tax liens, then the institutional investor must purchase a group of very unattractive tax liens, wherein such tax liens are typically not sold by the county and thus, the property taxes on such properties go uncollected.

County Sanctioned Premium Third Party Organizer

Still referring to FIG. 6, in at least one embodiment of the one or more present inventions, a system 506 is utilized by at least one county (or governing authority) to organize the tax liens into one or more subsets for purchase by one or more investors. More particularly, in one example, system 506 obtains or is provided a list of properties to have a tax lien levied from the county, and system 506 provides a database listing of the various properties' characteristics.

In at least one embodiment, a surcharge associated with system 506 is charged to the buyer of tax liens. Alternatively, in at least one embodiment, the county charges for a service provider to provide this service to the county, and the service providers are willing to pay for the opportunity because the service provider receives a surcharge associated with the information they provide. That is, in at least one embodiment, system 506 associates a series of preferences and characteristics with the listings, and a database listing of the properties and relevant characteristics may be provided. Investors using computers 112a-112n then have multi-level data access, including free listings or premium listings that include the tax lien and property characteristics. At least one investor, and more preferably, a plurality of investors access the refined tax lien database 508, and thereafter bid on the tax liens associated with the listed properties.

In at least one embodiment, system 506 is sanctioned by the county. Thereafter, system 506 may place all tax liens into categories as desired, and in one example, may have the ability to purchase in a first position any and all tax liens for a county to which they provide the categorization services, provided that after the public sale of the tax liens, the operator of system 506 agrees to purchase all unsold tax liens. As an analogy, the third party organizer gets to cut the cake of tax liens into what ever size pieces it chooses, so long as it contractually agrees to buy any unsold tax liens when all buyers have had an opportunity to bid on the available tax liens. Under this model, some counties could hold an auction for the right to be the third party organizer operating system 506, thereby charging a premium for large investors to organize and conduct the tax lien sale; with a goal to provide county governments with a much more efficient tax collection system than the archaic systems that currently exist.

Figure 7:
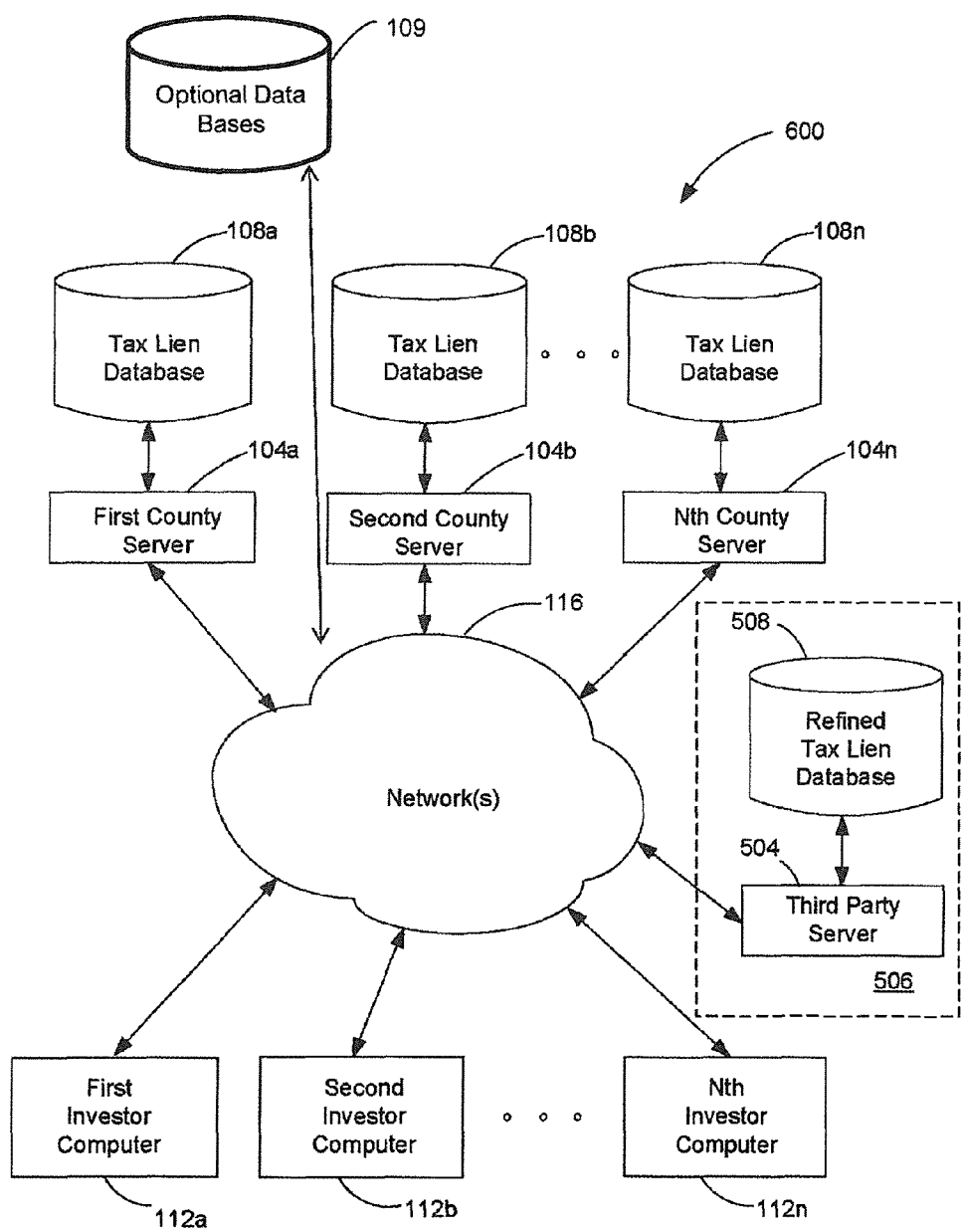
FIG. 7 is yet another block diagram depicting network architecture of a computerized tax lien information system using a third party organizer computer system in accordance with at least one embodiment of the one or more present inventions.

Referring now to FIG. 7, in yet another embodiment, a third party organizer provides a system 506 that provides categorization services to a plurality of counties. In other words, embodiment of the invention (such as the systems of FIGS. 3 and 6) can be implemented to download, categorize and rate tax liens from a plurality of counties or government entities across various states across the country.

More particularly, a third party organizer can provide a system 506 that utilizes a computer/server 504 to access a plurality of counties' servers tax lien databases 108a-108n via network 116 that interconnects the computer 504 to the respective county servers 104a-104n. Thereafter, in one example, computer 504 categorizes tax liens into groups that include one or more tax liens from a plurality of the participating counties. Again, as the system grows, the tax lien categorization system 506 enables privatization of tax lien sales to reduce the financial burden on counties, while increasing the participating counties' tax collection results.

One or more elements, features, functions and/or structures of the one or embodiments described herein can be combined to arrive at further tax lien categorization, investment and/or sales systems.

Pre-Purchase Fund

In accordance with at least one embodiment of the one or more present inventions, a pre-purchase fund is raised for buying one or more subsets of tax liens that generate an anticipated return within a categorized estimate of risk. By way of example and not limitation, a mutual fund or a private hedge fund is formed with specific return goals, wherein an element of the returns is met by planning for purchasing set dollar amounts of tax lien groups or subsets.

In at least one embodiment, participation in a tax lien mutual fund or a private tax lien hedge fund as an investor is priced in real time or near real time depending upon ongoing purchasing of groups or subgroups of tax liens being bought by a trading entity via computer, wherein the tax lien mutual fund or a private tax lien hedge fund pricing is linked, at least in part, to ongoing purchases of tax lien groups successfully achieved and the remaining purchasable groups and subsets across the United States for a given period of time. For example, the tax lien mutual fund or a private tax lien hedge fund may have allotted $50 million dollars in substantially lower risk tax liens that yield at least 10% annualized returns. This tax lien mutual fund or a private tax lien hedge fund position and the pricing of the funds is linked to attainment of the purchase goal within a given time window. Short and long positions may then be taken by investors in a given fund, with results of the fund, and thus the short and long positions, substantially influenced by the attainment of tax lien group purchase goals.

The one or more present inventions may be embodied in other specific forms without departing from its spirit or essential characteristics. The described embodiments are to be considered in all respects only as illustrative and not restrictive. The scope of the one or more present inventions is, therefore, indicated by the appended claims rather than by the foregoing description. All changes which come within the meaning and range of equivalency of the claims are to be embraced within their scope.

The one or more present inventions, in various embodiments, includes components, methods, processes, systems and apparatus substantially as depicted and described herein, including various embodiments, subcombinations, and subsets thereof. Those of skill in the art will understand how to make and use the one or more present inventions after understanding the present disclosure.

The one or more present inventions, in various embodiments, includes providing devices and processes in the absence of items not depicted and/or described herein or in various embodiments hereof including in the absence of such items as may have been used in previous devices or processes (e.g., for improving performance, achieving ease and/or reducing cost of implementation).

The foregoing discussion of the one or more present inventions has been presented for purposes of illustration and description. The foregoing is not intended to limit the one or more present inventions to the form or forms disclosed herein. In the foregoing Detailed Description for example, various features of the one or more present inventions are grouped together in one or more embodiments for the purpose of streamlining the disclosure. This method of disclosure is not to be interpreted as reflecting an intention that the claimed one or more present inventions requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the one or more present inventions.

Moreover, though the description of the one or more present inventions has included description of one or more embodiments and certain variations and modifications, other variations and modifications are within the scope of the one or more present inventions (e.g., as may be within the skill and knowledge of those in the art, after understanding the present disclosure). it is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A computer system for rating a plurality of tax liens of real properties from a plurality of county government computing systems, each of said plurality of county government computing systems having at least one county database containing county tax lien information relating to each of said plurality of tax liens of each real property in a county, each county government computing system being accessible over a network, comprising:
  at least one computer connected to the network and adapted to communicate with the plurality of county government computing systems to receive the county tax lien information including each of said plurality of tax liens, the computer determining one or more ratings of each of said plurality of tax liens; and
  at least one database connected with the at least one computer, the at least one database configured to store each of said one or more ratings associated with each of said plurality of tax liens;
  wherein the one or more ratings of each of said plurality of tax liens is accessible from the at least one database over the network to one or more third party computers.

2. The system of claim 1, wherein the one or more ratings of each of said plurality of tax liens are based on one or more common characteristics of the tax liens.

3. The system of claim 1, wherein the one or more ratings of each of said plurality of tax liens are based on one or more common characteristics of the real properties associated with the tax liens.

4. The system of claim 1, wherein the one or more ratings of each of said plurality of tax liens include an indication of whether a tax lien relates to a residential property.

5. The system of claim 1, wherein the one or more ratings of each of said plurality of tax liens include an indication of whether a tax lien relates to a commercial property.

6. The system of claim 1, wherein the one or more ratings of each of said plurality of tax liens include an indication of whether a tax lien relates to a vacant property.

7. The system of claim 1, wherein the one or more ratings of each of said plurality of tax liens are based upon an assessed value of a property.

8. The system of claim 1, wherein the one or more ratings of each of said plurality of tax liens is based upon an amount of a tax lien.

9. The system of claim 1, wherein the one or more ratings of each of said plurality of tax liens is based upon an assessed land value of the real property associated with a tax lien.

10. The system of claim 1, wherein the one or more ratings of each of said plurality of tax liens is based upon an assessed building value of the real property associated with a tax lien.

11. The system of claim 1, wherein the at least one computer obtains other information relating to each tax lien, including mortgage information related to the real property associated with the tax lien.

12. The system of claim 1, wherein the at least one computer obtains other information relating to each tax lien, including bankruptcy information related to an owner of the real property associated with the tax lien.

13. A computer system for rating a plurality of tax liens of one or more real properties, the tax liens recorded with a county government having a county server coupled with a county tax lien database containing county tax lien information available over a network, comprising:
  a computer connected to the network, the computer using a categorization protocol configured to categorize the county tax lien information from the county tax lien database, the computer providing a rating for each of said plurality of tax liens; and
  a database interconnected to the computer and adapted for storing categorized tax lien information and the ratings for each of said plurality of tax liens, the categorized tax lien information and the ratings for each of said plurality of tax liens in the database configured to be accessible to one or more third-party computers via the network.

14. The system of claim 13, wherein the categorizing protocol includes a plurality of criteria of whether the real property associated with each tax lien is a residential property; a plurality of ranges of assessed building values of the real properties associated with each tax lien; and an amount of each tax lien.

15. The system of claim 13, wherein the categorizing protocol includes a criteria of whether a tax lien relates to a residential property.

16. The system of claim 13, wherein the categorizing protocol includes a criteria of whether a tax lien relates to a commercial property.

17. The system of claim 13, wherein the categorizing protocol includes a criteria of a range of an assessed land value of the real property associated with the tax liens.

18. The system of claim 13, wherein the categorizing protocol includes a criteria of a range of an assessed building value of the real property associated with the tax liens.

19. A computer system for categorizing a plurality of tax liens of one or more real properties, the tax liens recorded with one or more of a plurality of county government computing systems, each of said plurality of county government computing systems having at least one county database containing county tax lien information, each county government computing system accessible over a network, comprising:
  at least one computer connected to the network and adapted to communicate with the plurality of county government computing systems to receive the county tax lien information, the at least one computer using a categorization protocol adapted for categorizing the county tax lien information from at least one county database of each of the plurality of county government computing systems; and
  at least one database connected with the at least one computer, the at least one database adapted for storing the categorized tax lien information;
  wherein the categorized tax lien information is accessible from the at least one database over the network to one or more third party investor computers.

20. The system of claim 19, wherein the categorizing protocol includes a plurality of criteria of whether the real property associated with each tax lien is a residential property; a plurality of ranges of assessed building values of the real properties associated with each tax lien; and an amount of each tax lien.

* * * * *